(12) United States Patent
Watanabe et al.

(10) Patent No.: US 8,195,392 B2
(45) Date of Patent: Jun. 5, 2012

(54) POSITION DETECTING APPARATUS AND METHOD USED IN NAVIGATION SYSTEM

(75) Inventors: Takayuki Watanabe, Iwaki (JP); Takehiko Sakagami, Iwaki (JP); Kotaro Wakamatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 516 days.

(21) Appl. No.: 12/428,182

(22) Filed: Apr. 22, 2009

(65) Prior Publication Data

US 2010/0030471 A1 Feb. 4, 2010

(30) Foreign Application Priority Data

Jul. 30, 2008 (JP) ................................. 2008-195577

(51) Int. Cl.
*G01C 21/00* (2006.01)
(52) U.S. Cl. ........................................................ 701/472
(58) Field of Classification Search .......... 701/216–217, 701/472
See application file for complete search history.

(56) References Cited

U.S. PATENT DOCUMENTS

| | | | | |
|---|---|---|---|---|
| 5,862,511 A * | 1/1999 | Croyle et al. | ................ | 701/445 |
| 6,226,591 B1 * | 5/2001 | Okumura et al. | ............ | 701/216 |
| 7,822,798 B2 * | 10/2010 | Toms | ............................ | 708/442 |
| 7,868,821 B2 * | 1/2011 | Hoshizaki | ................ | 342/357.42 |

(Continued)

FOREIGN PATENT DOCUMENTS

JP 08-068655 3/1996

OTHER PUBLICATIONS

Guo, L.-S., et al., "A low-cost integrated positioning system for autonomous off-highway vehicles", Proceedings of the Institution of Mechanical Engineers, Part D (Journal of Automobile Engineering), Nov. 2008, vol. 222, No. D11, pp. 1997-2009.*

(Continued)

*Primary Examiner* — Luke Gilligan
*Assistant Examiner* — Robert Sorey
(74) *Attorney, Agent, or Firm* — Brinks Hofer Gilson & Lione

(57) ABSTRACT

A position detecting apparatus and method used in a navigation system, which can improve positional accuracy and bearing accuracy even in a system equipped with few sensors, are provided. A position detecting apparatus used in a navigation system for detecting a vehicle position includes: a sensor unit including a vehicle speed sensor, an acceleration sensor, and an angular velocity sensor; and a dead reckoning calculating unit for calculating state quantity inclusive of a current vehicle position, a vehicle speed, and a vehicle attitude angle based on a signal output from each of the sensors at a predetermined periodic interval. The dead reckoning calculating unit includes: a movement calculating unit for calculating a movement during a period from a previous state quantity calculation time up to a current state quantity calculation time; a change amount detecting unit for calculating an amount of change in vehicle attitude; a movement resolving unit for resolving the movement into a vehicle longitudinal component, a vehicle lateral component, and a vehicle vertical component based on the amount of change in vehicle attitude; and a state quantity calculating unit for determining, by calculation, a vehicle position at the current state quantity calculation time using each of the components.

14 Claims, 22 Drawing Sheets

U.S. PATENT DOCUMENTS

| | | | |
|---|---|---|---|
| 2002/0198658 A1* | 12/2002 | Tanaka et al. | 701/216 |
| 2005/0065726 A1* | 3/2005 | Meyer et al. | 701/213 |
| 2008/0071476 A1* | 3/2008 | Hoshizaki | 701/214 |
| 2008/0294342 A1 | 11/2008 | Hoshizaki et al. | |
| 2009/0018772 A1 | 1/2009 | Watanabe et al. | |
| 2009/0254294 A1* | 10/2009 | Dutta | 702/92 |
| 2010/0109945 A1* | 5/2010 | Roh | 342/357.04 |

OTHER PUBLICATIONS

Mahamadd Marrdonny, Mohammad Mobed. "A guidance algorithm for launch to equatorial orbit". Aircraft Engineering and Aerospace Technology. Bradford: 2009. vol. 81, Iss. 2; p. 137.*

* cited by examiner

FIG. 6

ACCURACY COMPARISON BETWEEN RELATED ART AND EMBODIMENT OF PRESENT INVENTION
※SURROUNDING ENVIRONMENT: SPIRAL PARKING STRUCTURE (10F)

| SENSOR CONFIGURATION | BEARING ERROR AT TOP FLOOR [deg] | HEIGHT DIFFERENCE BETWEEN APPROACH AND EXIT [m] |
|---|---|---|
| RELATED ART (TRIAXIAL ACCELEROMETER/ BIAXIAL GYROSCOPE) | 3 | 5 |
| RELATED ART (MONOAXIAL ACCELEROMETER/ MONOAXIAL GYROSCOPE) | 20 | −11.6 |
| EMBODIMENT OF INVENTION (MONOAXIAL ACCELEROMETER/ MONOAXIAL GYROSCOPE) | 4 | 2.1 |

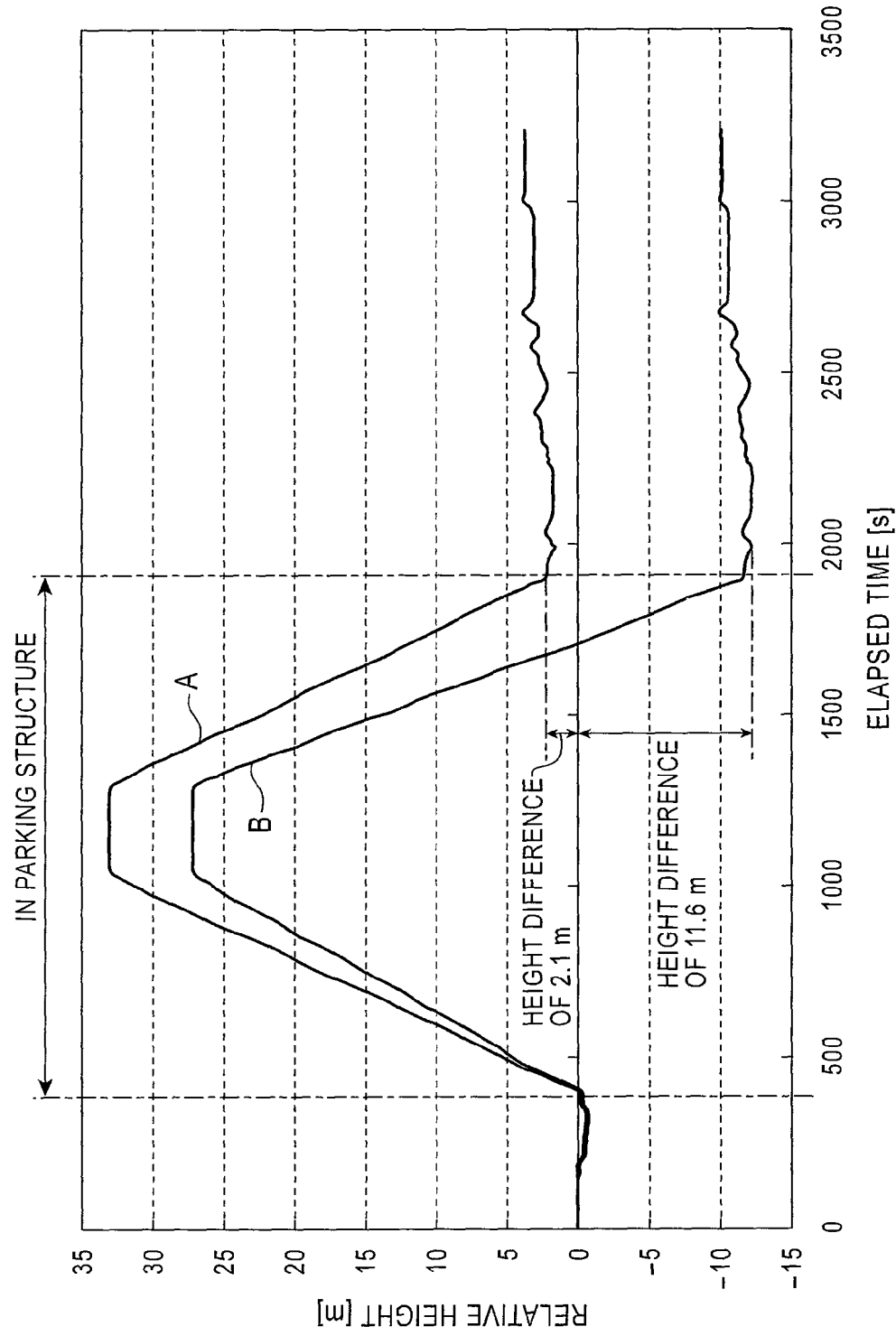

FIG. 11

$F(\hat{x}_k)$

|  | $\delta v_{xs}$ | $\delta v_{ys}$ | $\delta v_{zs}$ | $\delta N$ | $\delta E$ | $\delta D$ | $\delta\alpha$ | $\delta\beta$ | $\delta\gamma$ | $b_{\omega xs}$ | $b_{\omega ys}$ | $b_{\omega zs}$ | $b_{axs}$ | $b_{ays}$ | $b_{azs}$ | $\delta b$ | $\delta c$ | $\delta k_{wx}$ | $\delta k_{wy}$ | $\delta k_{wz}$ |
|---|---|---|---|---|---|---|---|---|---|---|---|---|---|---|---|---|---|---|---|---|
| $\delta v_{xs}$ | $I-\mathrm{Rot}(^{i}\hat{\omega}_s^s)T$ |  |  |  |  |  | $-\hat{T}_{sn}\mathrm{Rot}(\hat{g}'_n)T$ |  |  | $\mathrm{Rot}(^{e}\hat{v}_s^{OP})\hat{K}_\omega T$ |  |  | $IT$ |  |  |  |  | $\mathrm{Rot}(^{e}\hat{v}_s^{OP})\tilde{\mathrm{Vol}}_\omega T$ |  |  |
| $\delta v_{ys}$ |  |  |  |  |  |  |  |  |  |  |  |  |  |  |  |  |  |  |  |  |
| $\delta v_{zs}$ |  |  |  |  |  |  |  |  |  |  |  |  |  |  |  |  |  |  |  |  |
| $\delta N$ |  |  |  |  | $I$ |  | $\mathrm{Rot}(\hat{s}_n)$ |  |  |  |  |  |  |  |  |  |  |  |  |  |
| $\delta E$ |  |  |  |  |  |  |  |  |  |  |  |  |  |  |  |  |  |  |  |  |
| $\delta D$ |  |  |  |  |  |  |  |  |  |  |  |  |  |  |  |  |  |  |  |  |
| $\delta\alpha$ |  |  |  |  |  |  | $I$ |  |  | $-\hat{T}_{ns}\hat{K}_\omega T$ |  |  |  |  |  |  |  | $-\hat{T}_{ns}\tilde{\mathrm{Vol}}_\omega T$ |  |  |
| $\delta\beta$ |  |  |  |  |  |  |  |  |  |  |  |  |  |  |  |  |  |  |  |  |
| $\delta\gamma$ |  |  |  |  |  |  |  |  |  |  |  |  |  |  |  |  |  |  |  |  |
| $b_{\omega xs}$ |  |  |  |  |  |  |  |  |  | $I$ |  |  |  |  |  |  |  |  |  |  |
| $b_{\omega ys}$ |  |  |  |  |  |  |  |  |  |  |  |  |  |  |  |  |  |  |  |  |
| $b_{\omega zs}$ |  |  |  |  |  |  |  |  |  |  |  |  |  |  |  |  |  |  |  |  |
| $b_{axs}$ |  |  |  |  |  |  |  |  |  |  |  |  | $I$ |  |  |  |  |  |  |  |
| $b_{ays}$ |  |  |  |  |  |  |  |  |  |  |  |  |  |  |  |  |  |  |  |  |
| $b_{azs}$ |  |  |  |  |  |  |  |  |  |  |  |  |  |  |  |  |  |  |  |  |
| $\delta b$ |  |  |  |  |  |  | $-\hat{T}_{ab}\mathrm{Rot}(\hat{s}_b)$ |  |  |  |  |  |  |  |  | $I$ |  |  |  |  |
| $\delta c$ |  |  |  |  |  |  |  |  |  |  |  |  |  |  |  |  | $I$ |  |  |  |
| $\delta k_{wx}$ |  |  |  |  |  |  |  |  |  |  |  |  |  |  |  |  |  | $I$ |  |  |
| $\delta k_{wy}$ |  |  |  |  |  |  |  |  |  |  |  |  |  |  |  |  |  |  |  |  |
| $\delta k_{wz}$ |  |  |  |  |  |  |  |  |  |  |  |  |  |  |  |  |  |  |  | $I$ |

FIG. 12

$$G_k(\hat{x}_k)$$

| | $w_{\omega k}$ | $w_{ak}$ | $ds_b$ |
|---|---|---|---|
| $\delta v_{xs}$ | $Rot(^e\tilde{v}_s^{OP})\hat{K}_\omega T$ | I | |
| $\delta v_{ys}$ | | | |
| $\delta v_{zs}$ | | | |
| $\delta N$ | | | $\hat{T}_{nb}$ |
| $\delta E$ | | | |
| $\delta D$ | | | |
| $\delta\alpha$ | $-\hat{T}_{ns}\hat{K}_\omega$ | | |
| $\delta\beta$ | | | |
| $\delta\gamma$ | | | |
| $b_{\omega xs}$ | | | |
| $b_{\omega ys}$ | | | |
| $b_{\omega zs}$ | | | |
| $b_{axs}$ | | | |
| $b_{ays}$ | | | |
| $b_{azs}$ | | | |
| $\delta b$ | | | |
| $\delta c$ | | | |
| $\delta k_{wx}$ | | | |
| $\delta k_{wy}$ | | | |
| $\delta k_{wz}$ | | | |

FIG. 13

$H(\tilde{x}_k)$

| | | $\delta v_{xs}$ | $\delta v_{ys}$ | $\delta v_{zs}$ | $\delta N$ | $\delta E$ | $\delta D$ | $\delta\alpha$ | $\delta\beta$ | $\delta\gamma$ | $b_{\omega xs}$ | $b_{\omega ys}$ | $b_{\omega zs}$ | $b_{axs}$ | $b_{ays}$ | $b_{azs}$ | $\delta b$ | $\delta c$ | $\delta k$ |
|---|---|---|---|---|---|---|---|---|---|---|---|---|---|---|---|---|---|---|---|
| 1 | $\delta v_{xb\_obs}$ | $\tilde{T}_{bs}$ | | | | | | | | | | | | | | | $Rot(\tilde{v}_b)$ | | |
|   | $\delta v_{yb\_obs}$ | | | | | | | | | | | | | | | | | | |
|   | $\delta v_{zb\_obs}$ | | | | | | | | | | | | | | | | | | |
|   | $b_{\omega xs\_obs}$ | | | | | | | | | | I | | | | | | | | |
|   | $b_{\omega ys\_obs}$ | | | | | | | | | | | | | | | | | | |
|   | $b_{\omega zs\_obs}$ | | | | | | | | | | | | | | | | | | |
| 2 | $\delta N_{obs}$ | | | | I | | | | | | | | | | | | | | |
|   | $\delta E_{obs}$ | | | | | | | | | | | | | | | | | | |
|   | $\delta D_{obs}$ | | | | | | | | | | | | | | | | | | |
| 3 | $\delta v_{xn\_obs}$ | $\tilde{T}_{ns}$ | | | | | | $Rot(\tilde{v}_n)$ | | | | | | | | | | | |
|   | $\delta v_{yn\_obs}$ | | | | | | | | | | | | | | | | | | |
|   | $\delta v_{zn\_obs}$ | | | | | | | | | | | | | | | | | | |
| 4 | $\delta c_{21\_obs}$ | | | | | | | $-c_{11}$ | $c_{01}$ | | | | | | | | | | |

VEHICLE FIXED COORDINATE SYSTEM

NED COORDINATE SYSTEM

TRIAXIAL Acc
TRIAXIAL Gyro

TRIAXIAL Acc
BIAXIAL Gyro

TRIAXIAL Acc
MONOAXIAL Gyro

BIAXIAL Acc
MONOAXIAL Gyro

MONOAXIAL Acc
MONOAXIAL Gyro

ANAXIAL Acc
MONOAXIAL Gyro

FIG. 22

ACCURACY COMPARISON BASED ON THE NUMBER OF SENSOR AXES
IN KF SYSTEM WITH 6 DEGREES OF FREEDOM
※SURROUNDING ENVIRONMENT: SPIRAL PARKING STRUCTURE (10F)

| SENSOR CONFIGURATION | BEARING ERROR AT TOP FLOOR [deg] | HEIGHT DIFFERENCE BETWEEN APPROACH AND EXIT [m] |
|---|---|---|
| RELATED ART (TRIAXIAL ACCELEROMETER/ BIAXIAL GYROSCOPE) | 3 | 5 |
| RELATED ART (MONOAXIAL ACCELEROMETER/ MONOAXIAL GYROSCOPE) | 20 | -11.6 |

POSITION DETECTING APPARATUS AND METHOD USED IN NAVIGATION SYSTEM

RELATED APPLICATIONS

The present application claims priority to Japanese Patent Application Number 2008-195577, filed Jul. 30, 2008, the entirety of which is hereby incorporated by reference.

BACKGROUND

1. Field of the Invention

The present invention relates to a position detecting apparatus and method used in a navigation system, and more specifically to a position detecting apparatus and method used in a navigation system which correct a state quantity measured with a dead reckoning navigation unit (a state quantity including a vehicle position, a vehicle speed, and an attitude of a sensor or a vehicle) at a predetermined periodic interval and then recalculate a state quantity based on the corrected state quantity and output the calculated state quantity with the dead reckoning navigation unit.

2. Description of the Related Art

Dead reckoning navigation systems are configured using a vehicle speed pulse sensor as a vehicle distance sensor and an inertial sensor such as an accelerometer or an angular velocity meter (gyroscope) and are widely used to estimate a position or speed of a moving vehicle, an attitude of a sensor, or an attitude of a vehicle.

A general INS (inertial navigation system) includes a triaxial accelerometer and a triaxial gyroscope, and is used to determine six degrees of freedom of a moving object, in other words, determine both of three-dimensional translational motion and three-dimensional rotation. For example, a navigation system of an airplane or spacecraft determines six degrees of freedom of a moving object, that is, both three-dimensional translational motion and three-dimensional rotation using such an inertial navigation system. As for an in-vehicle navigation system, a vehicle speed pulse sensor is often used in place of an inertial sensor that is more costly.

According to dead reckoning navigation, a determined position can be updated based on sensor output without relying on an external signal. However, noise or other such error included in the sensor output increases over time at each integral calculation and thus, navigation is inadequate for long-time use. To that end, the following method has been devised (Japanese Unexamined Patent Application Publication No. 8-68655). The method integrates a GPS (global positioning system) receiver that provides a determined position with a finite error when there is reception of a satellite signal with a dead reckoning navigation system using an optimum probability algorithm such as a Kalman filter to thereby complementarily overcome or solve problems in the performance of both of the systems. Such a system is called an "integrated navigation system" and today finds wide use in applications from vehicle navigation to aerospace navigation.

The Kalman filter processing is intended to correct an error between a predicted (estimated) value of a predetermined state quantity and an observation value at a predetermined time to sequentially obtain an optimum estimated value at a corresponding time. In the Kalman filter processing, a calculating expression for estimating a target value is set in advance, and the estimation process is repeated until a time n at which an observation value Z(t) is obtained based on the calculation expression. If the observation value is obtained at the time n, an estimated value correction calculation is carried out to minimize a probabilistically defined error between the observation value and the estimated value at the time n.

FIG. 14 is a schematic explanatory view of Kalman filter processing. The Kalman filter processing is divided into a signal generation process 1 and an observation process 2 as shown in FIG. 14. In FIG. 14, a linear system F is provided. If a state of the linear system is represented by X(t) and a part of X(t) can be derived from an observation matrix H, the Kalman filter gives an optimum estimated value of X(t). Here, w represents noise generated in the signal generation process, and v represents noise generated in the observation process. The Kalman filter processing repeats Kalman processing at a predetermined periodic interval while using an input value as the observation value Z(t) to thereby obtain the optimum estimated value X(t).

A state equation of a system model in the Kalman filter processing is as follows:

[Expression 1]

$$\delta X(k+1) = F(k)\delta X(k) + w(k) \quad (1)$$

A system state variable $\delta X$ includes a state quantity such as each axial velocity, each axial position, and a sensor attitude, and is expressed as follows:

[Expression 2]

$$\delta x = [\delta v_{xs}, \delta v_{ys}, \delta v_{zs}, \delta N, \delta E, \delta D, \delta\alpha, \delta\beta, \delta\gamma, b_{axs},$$
$$b_{\omega ys}, b_{\omega zs}, b_{axs}, b_{ays}, b_{azs}, \delta b, \delta c, \delta k_{\omega x}, \delta k_{\omega y}, \delta k_{\omega z}] \quad (2)$$

The calculation is performed based on Expression 1 at a periodic interval T that is shorter than an interval at which the observation value Z(t) is obtained, and the obtained value is output as a state quantity. Then, if the observation value Z(t) is obtained, the optimum estimated value X(t) is calculated through Kalman filter processing. From then on, the calculation is performed using the optimum estimated value based on Expression 1.

An observation equation of the Kalman filter is as follows:

[Expression 3]

$$\delta Z(k) = H(k)\delta X(k) + v(k) \quad (3)$$

An error of the system state variable derived from Expression 1 is accumulated with time. To that end, the optimum estimated value of a system state variable $\delta X(k)$ is determined each time an observation value $\delta AZ(k)$ is obtained. From then on, the system state quantity $\delta X(k)$ is calculated using the optimum estimated value and output based on Expression 1 until the next observation value is obtained.

To be specific, the Kalman filter executes a calculation based on Expression 4 below to obtain the optimum estimated value $X(t|t)(=\delta X(t|t))$ each time the observation value Z(t) $(=\delta Z(t))$ is obtained (at a periodic interval at which the observation value $\delta Z(t)$ is input). Here, it is assumed that an estimated value of A, which is obtained at a time i based on information up to a time j, is expressed by A(i|j). In the following expression, X(t|t-1) represents a previously estimated value, and K(t) represents a Kalman gain.

[Expression 4]

$$X(t|t) = X(t|t-1) + K(t)\{Z(t) - HX(t|t-1)\} \quad (4)$$

The optimum estimated value X(t|t) is calculated by multiplying a difference in brackets { } on the right side by the Kalman gain. The previously estimated value and the Kalman gain are expressed as follows:

[Expression 5]

$$X(t|t-1) = FX(t-1|t-1) \quad (5a)$$

$$K(t) = P(t|t-1)H^T(HP(t|t-1)H^T + V)^{-1} \quad (5b)$$

The previously estimated value X(t|t−1) is updated based on Expression 5a corresponding to Expression 1 at a period interval shorter than the period interval at which Z(t) is input.

Further, in Expression 5b, P represents an error covariance matrix of the state quantity Z, P(t|t−1) represents a predicated value of error covariance, and P(t−1|t−1) represents an error covariance. P(t|t−1) and P(t−1|t−1) are expressed as follows:

[Expression 6]

$$P(t|t-1) = FP(t-1|t-1)F^T + W)$$

$$P(t-1|t-1) = (I - K(t-1)H)P(t-1|t-2) \quad (6)$$

V represents a variance of noise v generated in the observation process, and W represents a variance of noise w generated in the signal generation process. A suffix $()^T$ means a transposed matrix, and a suffix $()^{-1}$ means an inverse matrix. Further, "I" refers to a unit matrix. Moreover, V and W represent white Gaussian noise with zero mean and have no correlation. In such a Kalman filter, if an appropriate error is set for an initial value of the error covariance P and the state quantity X, and an optimum estimated value is obtained based on Expression 4 upon each observation and from then on, the state quantity X is calculated based on Expression 5a, and an accuracy of the state quantity can be improved.

FIG. 15 is a diagram of a position detecting unit in the in-vehicle navigation system described by the assignee of the subject invention in Japanese Unexamined Patent Application Publication No. 2008-039563. Dead-reckoning input signals are classified into a signal output from an inertial sensor on a sensor board 10 and a vehicle speed pulse obtained from a vehicle body through a different cable. As the inertial sensor, an accelerometer (triaxial one for detecting an acceleration) 10a and a gyroscope (triaxial one for detecting an angular velocity) 10b are adopted. As the sensor for generating a vehicle speed pulse, a vehicle speed sensor 11 that generates one pulse each time a vehicle moves a predetermined distance is employed. FIG. 16A shows a sensor coordinate system Xs-Ys-Zs fixed to the sensor board 10. In the following Expressions, it should be noted that a value with a suffix "s" is related to the sensor (board) coordinate system. FIG. 16B shows the sensor configuration of a basic system having six degrees of freedom with three axes (Acc x, Acc y, Acc z) of the accelerometer 10a and three axes (Gyro x, Gyro y, Gyro z) of the gyroscope 10b on the sensor board 10. The triaxial accelerometer (Acc x to Acc z) detects acceleration in three coordinate directions (x, y, z) of the sensor coordinate system, and the triaxial gyroscope (Gyro x to Gyro z) detects angular velocities P, Q, and R about the three coordinate axes (x, y, z) of the sensor coordinate system.

FIG. 17A shows a coordinate system Xb-Yb-Zb fixed to a vehicle. In the following Expressions, a value with a suffix "b" is related to the vehicle-fixed coordinate system. FIG. 17B shows a surface fixed coordinate system North-East-Down (NED coordinate system) at any latitude and longitude. In the following Expressions, a value with a suffix "n" is related to the NED coordinate system.

Returning to FIG. 15, a dead reckoning calculating unit 12 updates and outputs a vehicle state quantity inclusive of current vehicle position, speed, and attitude based on a predetermined computational expression using an algorithm of a basic system having six degrees of freedom at a high frequency, for example, 2.5 Hz.

A GPS receiver 13 receives, from each of plural artificial satellites, a signal regarding a distance and a rate of change in distance to input measured values of a position (latitude N, longitude E, height D) of an antenna of a vehicle and a vehicle speed (northward speed $V_N$, eastward speed $V_E$, vertical speed $V_D$) to a Kalman filter correcting unit 14 at 1 Hz. The Kalman filter correcting unit 14 corrects a vehicle state quantity inclusive of current vehicle position, speed, and attitude. For example, the Kalman filter correcting unit 14 performs state quantity correction processing using a speed (during moving) output from the vehicle speed sensor 11 or an angular velocity offset (when stopped) output from a gyroscope 10b as an observation value and then inputs the resultant value to the dead reckoning calculating unit 12, at 5 Hz. Further, the Kalman filter correcting unit 14 inputs to the dead reckoning calculating unit 12 a corrected state quantity obtained by performing the state quantity correction processing using the position and speed (N, E, D, $v_N$, $v_E$, $v_D$) output from the GPS receiver 13 at 1 Hz.

FIG. 18 is a flowchart of the processing of the position detecting unit in FIG. 15.

First, initial values of three-dimensional vehicle positions N, E, D, a vehicle speed Vx, a pitch angle θ, a vehicle mounting pitch angle A, a yaw angle Y, a vehicle mounting yaw angle A2, a gyroscope offset $\omega_{OF}$, and an acceleration sensor offset $\alpha_{OF}$ are set in the dead reckoning calculating unit 12 (step S101). The gyroscope 10b and the accelerometer 10a are ideally mounted to a vehicle in parallel to both sides of the vehicle as viewed from the side. However, as shown in FIG. 19A, a mounting error is involved when mounted. Thus, the sensors are mounted at an angle A (mounting pitch angle) to the vehicle direction. Here, an angle θ between the horizontal direction and the sensor direction is referred to as "pitch angle", and the pitch angle is the sum of an inclined angle and the mounting pitch angle. Further, the gyroscope 10b and the accelerometer 10a are ideally mounted to the vehicle in the form of being collinear with the vehicle direction as projected on a plane. However, a mounting error is involved when mounted. Thus, as shown in FIG. 19B, the sensors are mounted at an angle A2 (mounting yaw angle) to the vehicle direction. An angle Y between the northward direction and the sensor direction is referred to as "yaw angle". The yaw angle Y is the sum of the vehicle direction and the mounting yaw angle.

Subsequently, the dead reckoning calculating unit 12 receives output signals of the gyroscope 10b, the accelerometer 10a, and the vehicle speed sensor 11 (step S102) and calculates a state quantity such as each axial velocity, each axial position, and a sensor attitude based on Expression 2 following a dead reckoning calculating algorithm at a first frequency (frequency of 25 Hz) and then outputs the resultant value (step S103).

Next, the dead reckoning calculating unit 12 checks whether the frequency is switched to a second frequency (frequency of 10 Hz) (step S104). If the frequency is not switched to the second frequency, the dead reckoning calculating unit 12 repeats step S102 and subsequent steps.

If the frequency is switched to the second frequency, the dead reckoning calculating unit 12 determines whether a vehicle is stopped based on whether the vehicle speed Vx is kept at zero for 2 seconds or more (step S105).

If the vehicle is not stopped, the dead reckoning calculating unit 12 checks whether the frequency is switched to a third frequency (1 Hz-frequency=GPS location frequency) (step S106). If the frequency is not switched to the third frequency, the Kalman filter correcting unit 14 corrects a vehicle longitudinal speed (observation value) Vx calculated using an output signal of the vehicle speed sensor 11 and a vehicle speed calculated with the dead reckoning calculating unit 12 based on Kalman filter processing and inputs the corrected state quantity to the dead reckoning calculating unit 12 (step S107). In step S107, first correction processing is executed using a first Kalman filter observation matrix H1.

In step S106, if the frequency is switched to the third frequency, the Kalman filter correcting unit 14 uses the three-dimensional vehicle positions N, E, D and three-dimensional vehicle speeds $v_N$, $v_E$, $v_D$ output from the Kalman filter correcting unit 14 as observation values to correct a vehicle state quantity and then inputs the corrected state quantity to the dead reckoning calculating unit 12 (step S108). In step S108, second correction processing is executed using a second Kalman filter observation matrix H2.

In step S105, if the vehicle is stopped, it is checked whether the frequency is switched to the third frequency (1 Hz-frequency=GPS location frequency) (step S109). If the frequency is not switched to the third frequency, the Kalman filter correcting unit 14 carries out the correction processing in step S107 as well as corrects a vehicle state quantity based on a gyroscope output signal regarding an angular velocity (observation value) and an angular velocity signal offset calculated with the dead reckoning calculating unit 12 and then inputs the corrected state quantity to the dead reckoning calculating unit 12 (step S110). In step S110, third correction processing is executed using a third Kalman filter observation matrix H3.

In step S109, if the frequency is switched to the third frequency, the Kalman filter correcting unit 14 carries out the correction processing in step S108 as well as corrects an angular velocity offset based on a difference between a gyroscope output signal regarding an angular velocity and an angular velocity signal offset calculated with the dead reckoning calculating unit 12 (step S111). In step S111, fourth correction processing is executed using a fourth Kalman filter observation matrix H4.

The above description is focused on the basic system having six degrees of freedom with the triaxial gyroscope. This system includes many sensors and thus is costly. In view of this, the position detecting unit in FIG. 15 is also applicable to a configuration with fewer sensors. FIGS. 20A to 21C are explanatory views showing various types of sensor configuration. FIGS. 20A and 20B are explanatory views of a sensor coordinate system and a basic system having six degrees of freedom similar to those in FIGS. 16A and 16B.

FIG. 20C is an explanatory view of the sensor configuration of a system equipped with a triaxial accelerometer and a biaxial gyroscope on the sensor board 10 of FIG. 10A. In this system, the biaxial gyroscope makes detection in two axial directions (Gyro x and Gyro z).

FIG. 20D is an explanatory view of the sensor configuration of a system equipped with a triaxial accelerometer and a monoaxial gyroscope on the sensor board 10 of FIG. 10A. In this system, the monoaxial gyroscope makes detection in one axial direction (Gyro z).

FIG. 21A is an explanatory view of the sensor configuration of a system equipped with a biaxial accelerometer and a monoaxial gyroscope on the sensor board 10 of FIG. 10A. In this system, the biaxial accelerometer makes detection in two axial directions (Acc x and Acc y), and the monoaxial gyroscope makes detection in one axial direction (Gyro z).

FIG. 21B is an explanatory view of the sensor configuration of a system equipped with a monoaxial accelerometer and a monoaxial gyroscope on the sensor board 10 of FIG. 10A. In this system, the monoaxial accelerometer makes detection in one axial direction (Acc x), and the monoaxial gyroscope makes detection in one axial direction (Gyro z).

FIG. 21C is an explanatory view of the sensor configuration of a system equipped with an anaxial accelerometer (unused) and a monoaxial gyroscope on the sensor board 10 of FIG. 10A. In this system, the monoaxial gyroscope makes detection in one axial direction (Gyro z).

The dead reckoning calculating unit 12 in FIG. 15 updates a vehicle state quantity inclusive of current vehicle position, speed, and attitude at a high frequency based on the same algorithm used in the basic system with six degrees of freedom at any time. Thus, a sensor configuration controller (SC controller) 15 identifies the actual sensor configuration of an in-vehicle navigation system to estimate an output value of a sensor not included in the basic system to send the value to the dead reckoning calculating unit 12. For example, used as an output value of a sensor not included in the system is a function value of a function that sets a constant (inclusive of 0), white noise, or an output value of another sensor as a variable.

However, the system having fewer sensors involves a problem of lower accuracy. FIG. 22 is an explanatory view of a correspondence relationship between sensor configuration and accuracy. FIG. 22 shows (1) a bearing error (deg) between a road bearing and an estimated vehicle bearing in the case where a vehicle is stopped in parallel to the road at the top floor of a 10-story spiral parking out of GPS range and (2) a difference in estimated height (m) in the case where a vehicle enters the parking from a ground-floor entrance and drives up to the top floor and then returns to a ground-floor exit. In a system equipped with a triaxial accelerometer and a biaxial gyroscope, the bearing error is 3 degrees, and the height difference is 5 m, while in a system equipped with a monoaxial accelerometer and a monoaxial gyroscope, the bearing error and the height difference are as large as 20 degrees (see FIG. 7B) and −11.6 m (see a curve B in FIG. 8), respectively.

SUMMARY

In view of the above circumstances, it is an object to improve a positional accuracy and a bearing accuracy even in a system with fewer sensors, for example, in a system equipped with a monoaxial accelerometer and a monoaxial gyroscope. One embodiment of the present invention provides a position detecting apparatus and method used in a navigation system for detecting a vehicle position.

[Position Detecting Apparatus]

A position detecting apparatus according to one embodiment includes: a sensor unit including a vehicle speed sensor for detecting a vehicle speed, an acceleration sensor for detecting vehicle acceleration, and an angular velocity sensor for detecting a vehicle angular velocity; and a dead reckoning calculating unit for calculating state quantity inclusive of a current vehicle position, a vehicle speed, and a vehicle attitude angle based on a signal output from each of the sensors at a predetermined periodic interval, the dead reckoning calculating unit including a movement calculating unit for calculating a movement during a period from a previous state quantity calculation time up to a current state quantity calculation time; a change amount detecting unit for calculating an amount of change in vehicle attitude; a movement resolving unit for resolving the movement into a vehicle longitudinal component, a vehicle lateral component, and a vehicle vertical component based on the amount of change in vehicle attitude; and a state quantity calculating unit for determining, by calculation, a vehicle position at the current state quantity calculation time using each of the components.

The change amount detecting unit detects (1) an amount of change in vehicle pitch angle and an amount of change in vehicle yaw angle or (2) an amount of change in vehicle yaw angle as the amount of change in vehicle attitude. At this time, the change amount detecting unit calculates the amount of change in vehicle pitch angle and the amount of change in vehicle yaw angle based on a vehicle attitude angle calculated by the state quantity calculating unit.

If an amount of change in vehicle pitch angle and an amount of change in vehicle yaw angle are detected as the amount of change in vehicle attitude, and the amount of change in vehicle pitch angle and the amount of change in vehicle yaw angle are represented by $\dot{E}_2$, $\dot{E}_3$, respectively, and the movement is represented by $N_pL$, the movement resolving unit resolves the movement into a vehicle longitudinal component, a vehicle lateral component, and a vehicle vertical component based on the following expressions:

[Expression 7]

Vehicle longitudinal component=$N_pL \times \cos(\dot{E}_2) \times \cos(\dot{E}_3)$ Vehicle lateral component=$N_pL \times \cos(\dot{E}_2) \times \sin(\dot{E}_3)$ Vehicle vertical component=$N_pL \times \sin(\dot{E}_2)$ (7)

Further, if a change amount of vehicle yaw angle is detected as the amount of change in vehicle attitude, and if the amount of change in vehicle yaw angle is represented by $\dot{E}_3$, and the movement is represented by $N_pL$, the movement resolving unit resolves the movement into a vehicle longitudinal component, a vehicle lateral component, and a vehicle vertical component based on the following expressions:

[Expression 8]

Vehicle longitudinal component=$N_pL \times \cos(\dot{E}_3)$

Vehicle lateral component=$N_pL \times \sin(\dot{E}_3)$

Vehicle vertical component=0 (8)

The position detecting apparatus further includes: a state quantity correcting unit that performs state quantity correction processing at a second periodic interval longer than the predetermined periodic interval at which the dead reckoning calculating unit calculates a state quantity based on a vehicle moving speed measured using an output signal of the vehicle speed sensor and the state quantity calculated with the dead reckoning calculating unit to thereby correct the state quantity calculated with the dead reckoning calculating unit, the state quantity correcting unit including a speed resolving unit for resolving the measured moving speed into a vehicle longitudinal component, a vehicle lateral component, and a vehicle vertical component based on the amount of change in vehicle attitude; and a corrected state quantity calculating unit for determining, by calculation, a corrected state quantity based on each of the speed components, and the state quantity calculated with the dead reckoning calculating unit.

If the amount of change in vehicle attitude corresponds to the amount of change in yaw angle and the amount of change in pitch angle, the amount of change in pitch angle and the amount of change in yaw angle are represented by $\dot{E}_2$, $\dot{E}_3$, respectively, and the measured moving speed is represented by V, the speed resolving unit resolves the moving speed into a vehicle longitudinal component, a vehicle lateral component, and a vehicle vertical component based on the following expressions:

[Expression 9]

Vehicle longitudinal component=$|V| \times \cos(\dot{E}_2) \times \cos(\dot{E}_3)$ Vehicle lateral component=$|V| \times \cos(\dot{E}_2) \times \sin(\dot{E}_3)$ Vehicle vertical component=$|V| \times \sin(\dot{E}_2)$ (9)

Further, if the amount of change in vehicle attitude corresponds to the amount of change in yaw angle, the amount of change in yaw angle is represented by $\dot{E}_3$, and the measured moving speed is represented by V, the speed resolving unit resolves the moving speed into a vehicle longitudinal component, a vehicle lateral component, and a vehicle vertical component based on the following expressions:

[Expression 10]

Vehicle longitudinal component=$|V| \times \cos(\dot{E}_3)$ )

Vehicle lateral component=$|V| \times \sin(\dot{E}_3)$

Vehicle vertical component=0 (10)

A position detecting method according to one embodiment of the present invention, which is used in a navigation system for calculating state quantity inclusive of a current vehicle position, a vehicle speed, and a vehicle attitude angle based on a signal output from a vehicle speed sensor for detecting a vehicle speed, an acceleration sensor for detecting vehicle acceleration, and an angular velocity sensor for detecting a vehicle angular velocity based on a dead reckoning process, includes: a first step of calculating a movement during a period from a previous state quantity calculation time up to a current state quantity calculation time using a signal output from the vehicle speed sensor; a second step of calculating an amount of change in vehicle attitude; a third step of resolving the movement into a vehicle longitudinal component, a vehicle lateral component, and a vehicle vertical component based on the amount of change in vehicle attitude; and a fourth step of determining, by calculation, a vehicle position at the current state quantity calculation time using each of the components.

In the second step, (1) an amount of change in vehicle pitch angle and an amount of change in vehicle yaw angle or (2) an amount of change in vehicle yaw angle are detected as the amount of change in vehicle attitude.

The third step is processing executed by the movement resolving unit of the position detecting apparatus, and a movement is resolved into a vehicle longitudinal component, a vehicle lateral component, and a vehicle vertical component based on Expression 7 or 8.

The position detecting method further includes: a fifth step of measuring a vehicle moving speed using an output signal of the vehicle speed sensor at a second periodic interval longer than the predetermined periodic interval at which a state quantity is calculated based on the dead reckoning process; and a sixth step of performing state quantity correction processing based on the measured vehicle moving speed and the state quantity calculated through the dead reckoning process to thereby correct the state quantity calculated through the dead reckoning process, the sixth step including a resolving step of resolving the measured moving speed into a vehicle longitudinal component, a vehicle lateral component, and a vehicle vertical component based on the amount of change in vehicle attitude; and a calculating step of determining, by calculation, a corrected state quantity based on each of the speed components, and the state quantity calculated through the dead reckoning calculating process.

The resolving step is processing executed by the speed resolving unit of the position detecting apparatus, and the measured moving speed is resolved into a vehicle longitudinal component, a vehicle lateral component, and a vehicle vertical component based on Expression 9 or 10.

According to the present embodiment, if a vehicle attitude angle, for example, a pitch angle or a yaw angle is changed during driving, a vehicle moving distance is resolved into a vehicle longitudinal component, a vehicle lateral component, and a vehicle vertical component in consideration of amounts of change in pitch angle and yaw angle, whereby an accuracy of a moving distance vector can be increased, and an accuracy of calculation for a vehicle position can be improved.

Further, if a vehicle attitude angle, for example, a pitch angle or a yaw angle is changed during driving, a vehicle moving distance is resolved into a vehicle longitudinal component $V_{xb}$-obs, a vehicle lateral component $V_{yb}$-obs, and a vehicle vertical component $V_{zb}$-obs in consideration of amounts of change in pitch angle and yaw angle, whereby an accuracy of a moving distance vector can be increased, and an accuracy of a speed, a sensor attitude angle, and a sensor mounting angle can be improved.

Further, a positional accuracy and a bearing accuracy can be improved with a system configuration having fewer sensors. Hence, the cost of the navigation system can be reduced.

Moreover, a relative height accuracy can be improved and thus, the present invention is applicable to a determination unit for indicating a junction between an expressway and an open road under the expressway.

BRIEF DESCRIPTION OF THE DRAWINGS

FIG. 6 is a table illustrating an accuracy comparison between the related art and an embodiment of the present invention;

FIG. 8 is an explanatory view of a height difference;

FIG. 11 is an explanatory view of elements of a matrix F;

FIG. 12 is an explanatory view of elements of a matrix Gk;

FIG. 13 is an explanatory view of elements of a matrix H;

FIGS. 21A to 22C are additional explanatory views of various types of sensor configuration;

FIG. 22 is a table illustrating a comparison between sensor configuration and accuracy in the related art.

Figure 15:
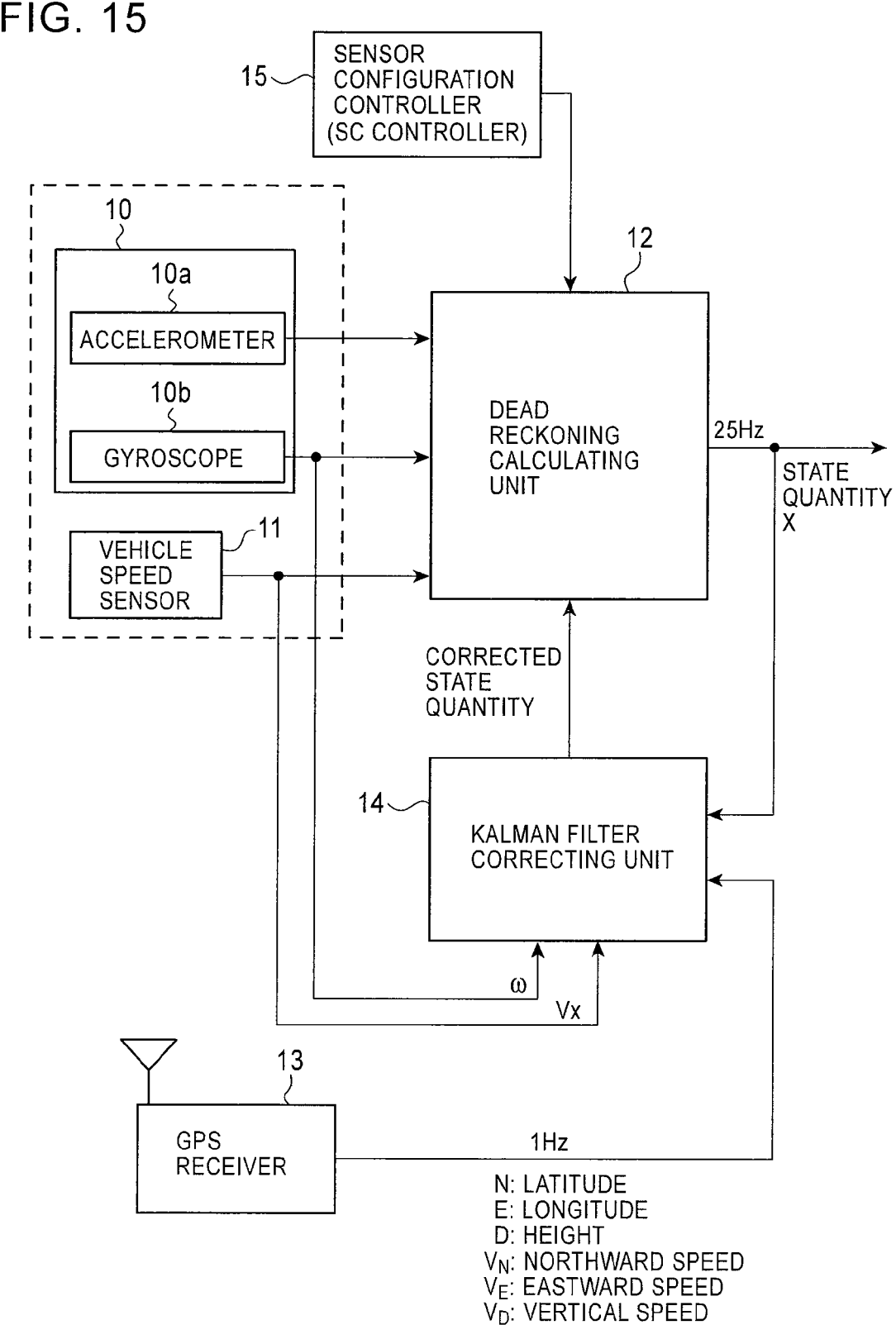
FIG. 15 is a diagram of a position detecting unit in a navigation system.
Figure 16A:
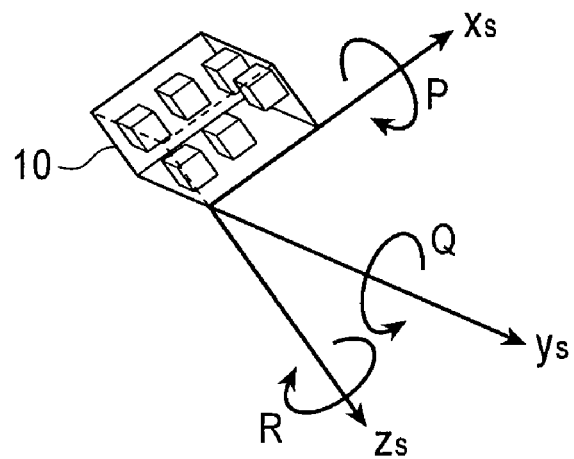
FIGS. 16A and 16B are explanatory views of a sensor coordinate system Xs-Ys-Zs fixed to a sensor board and a sensor configuration of a basic system having six degrees of freedom with a triaxial accelerometer (Acc x, Acc y, Acc z) and a triaxial gyroscope (Gyro x, Gyro y, Gyro z)
Figure 16B:
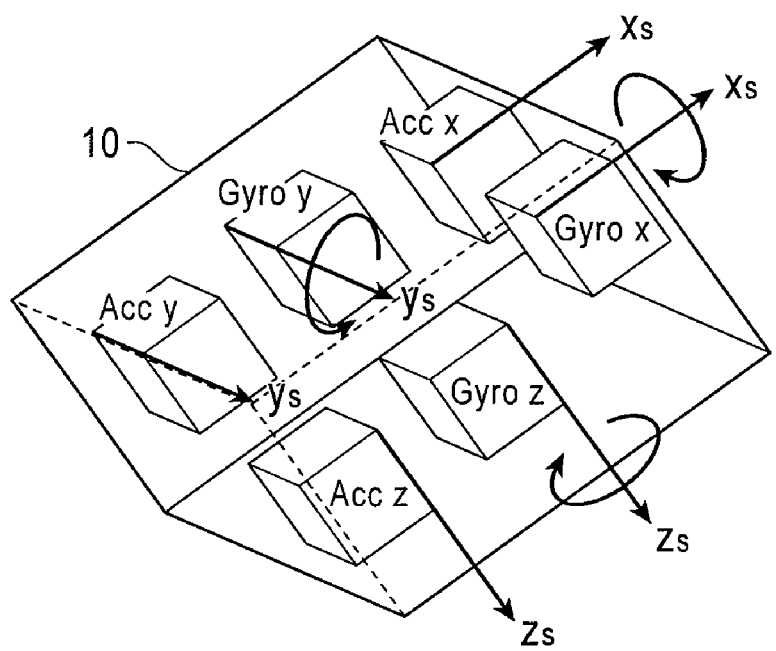
Figure 17A:
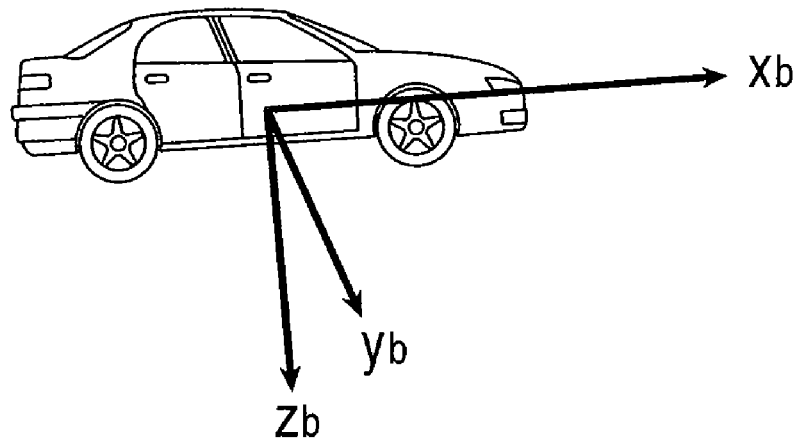
FIGS. 17A and 17B are explanatory views of a vehicle fixed coordinate system Xb-Yb-Zb and a surface fixed coordinate system North-East-Down (NED coordinate system)
Figure 17B:
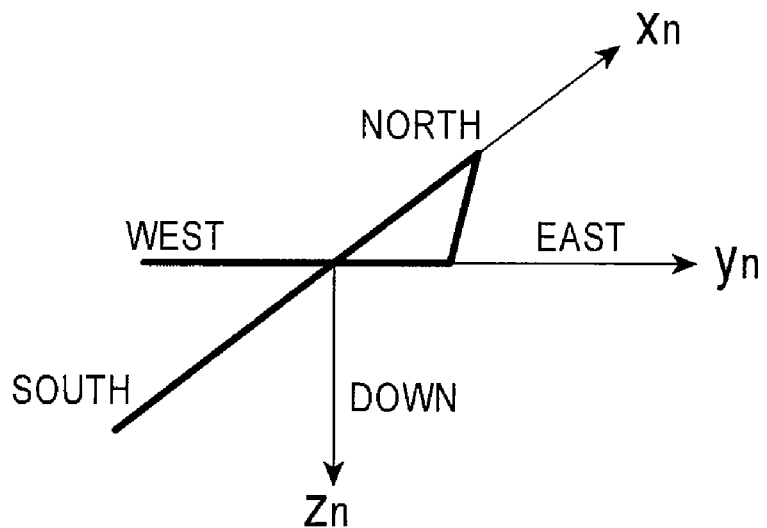
Figure 18:
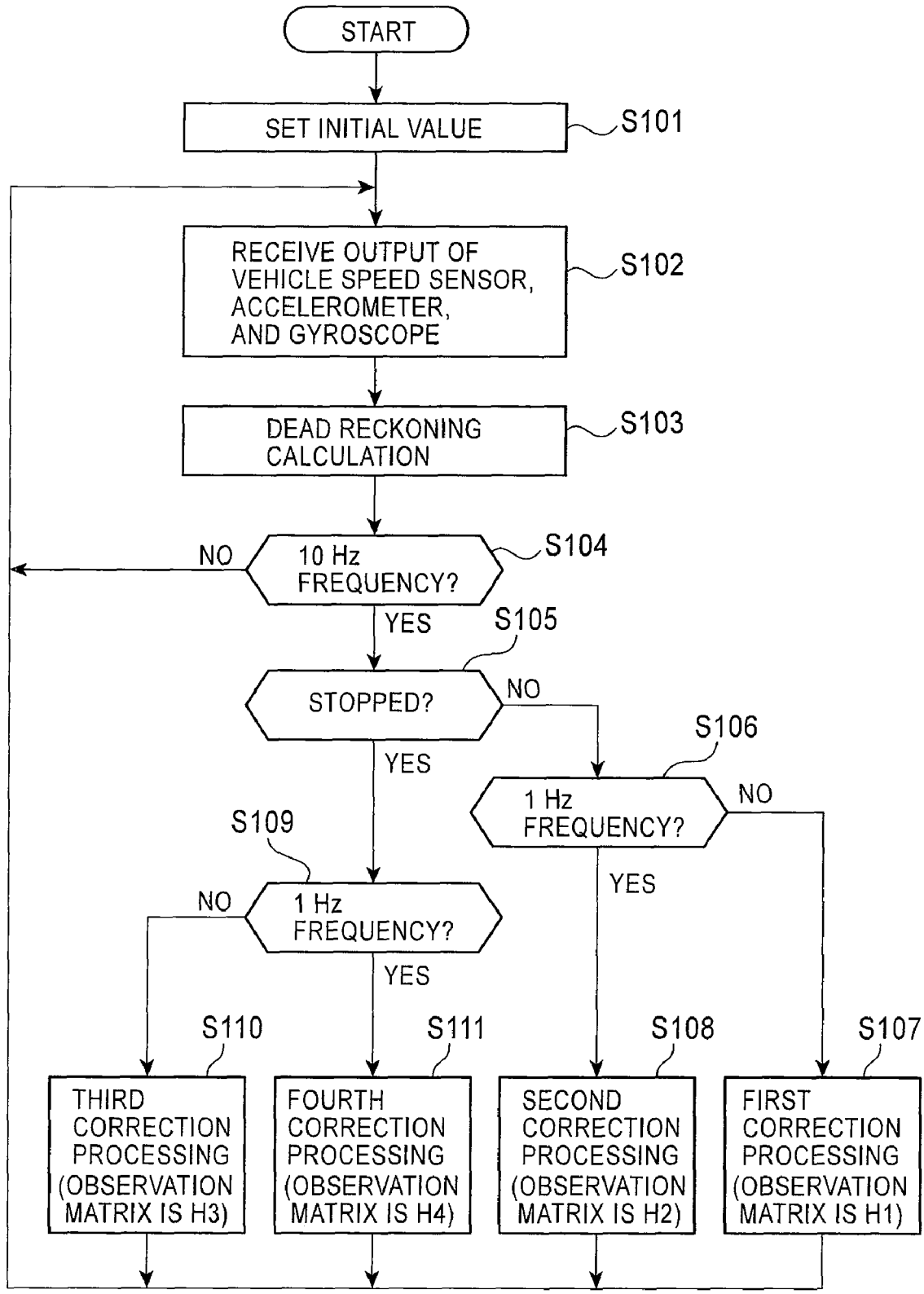
FIG. 18 is a flowchart of the processing of the position detecting unit in FIG. 15.
Figure 19A:
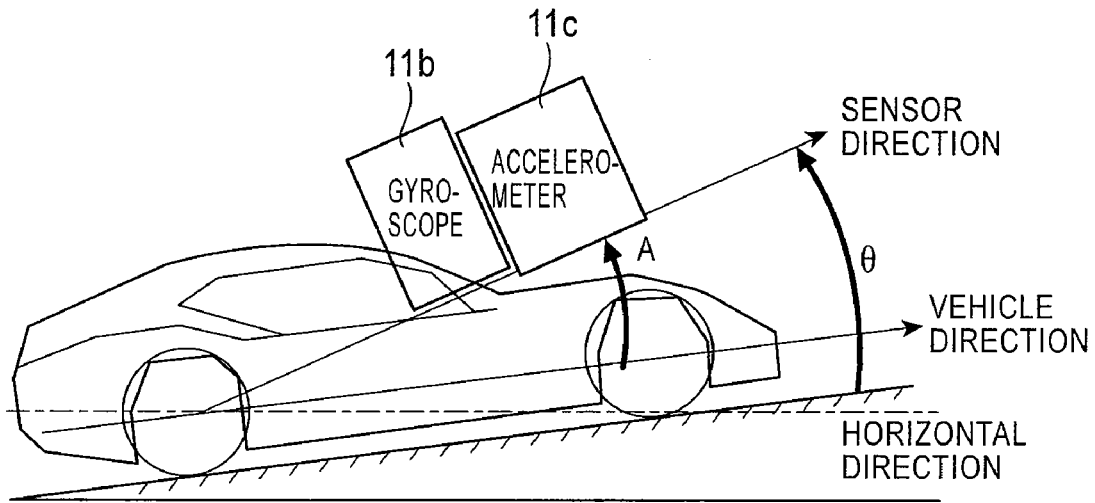
FIGS. 19A and 19B are explanatory views of sensor attitude pitch angle and sensor attitude yaw angle.
Figure 19B:
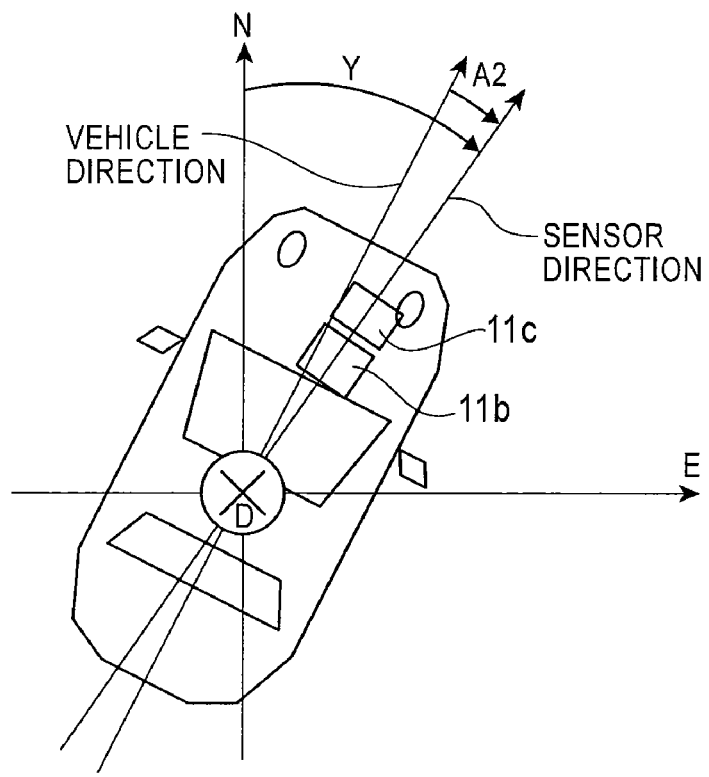
Figure 20A:
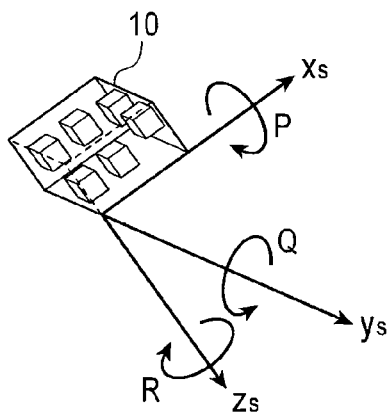
FIGS. 20A to 20D are explanatory views of various types of sensor configuration.
Figure 20B:
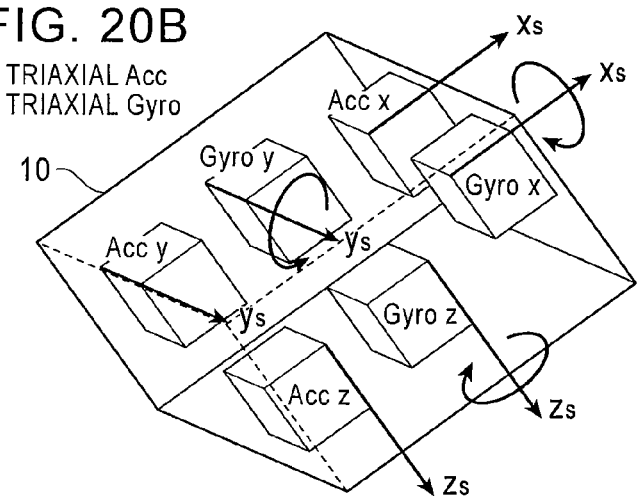
Figure 20C:
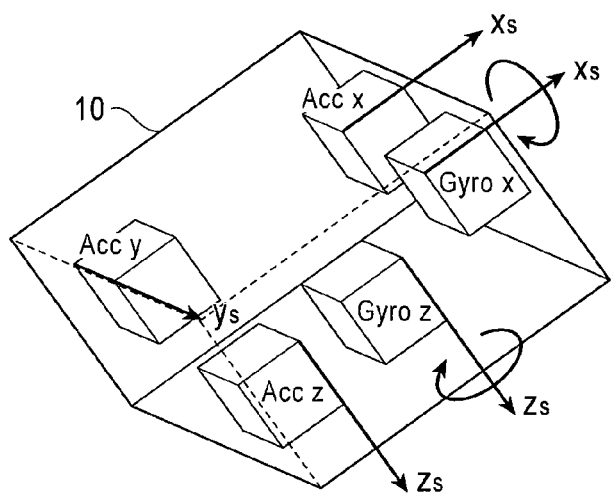
Figure 20D:
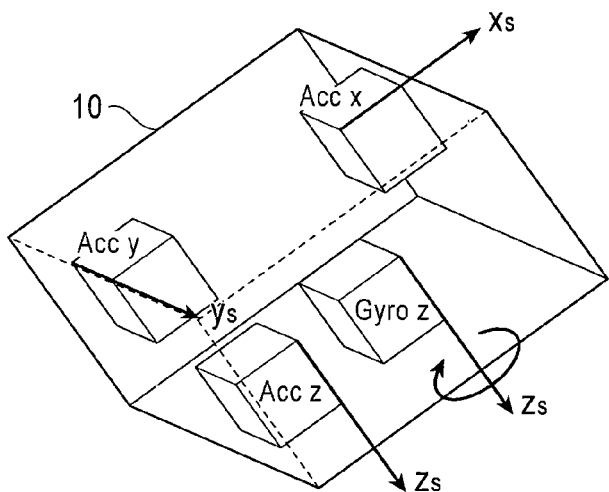
Figure 21A:
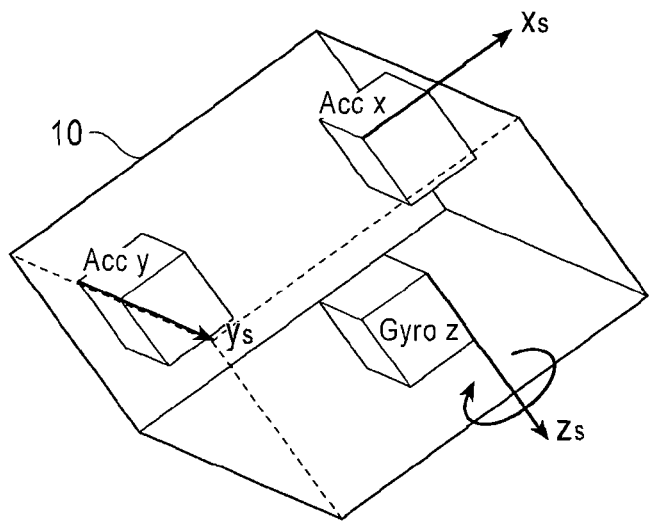
Figure 21B:
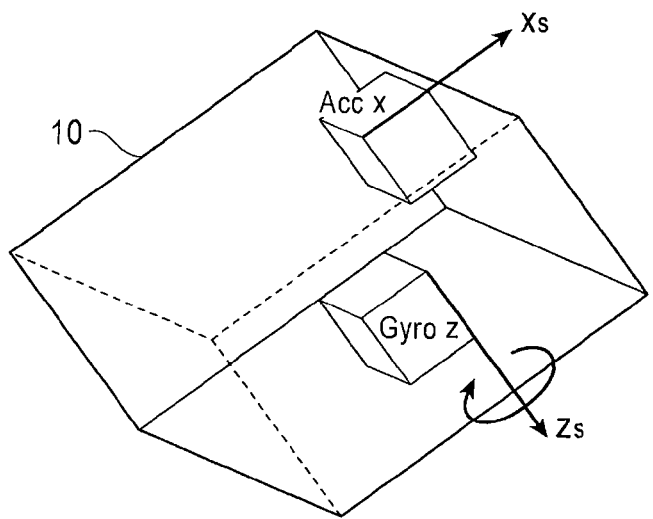
Figure 21C:
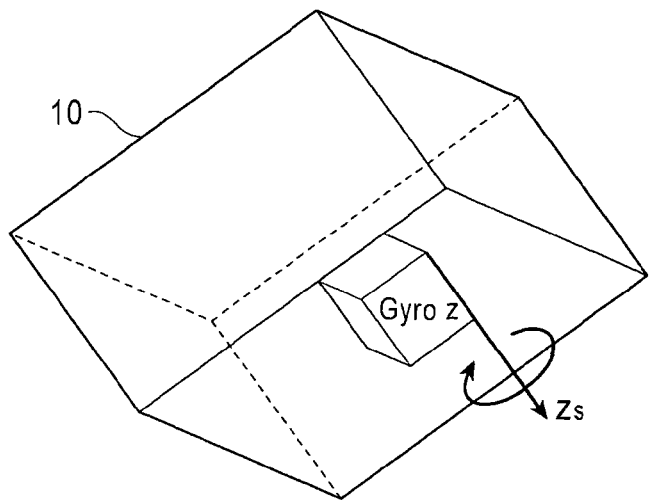

DESCRIPTION OF THE PREFERRED EMBODIMENTS (A) Principle of the Present Invention (a) Analysis of Problems in the Related Art A dead reckoning calculating unit 12 in FIG. 15 calculates a state quantity inclusive of each axial velocity, each axial position, and a sensor attitude based on a dead reckoning calculating algorithm. According to the dead reckoning calculating algorithm of the related art, a position $P_n$ in an NED coordinate system is derived from the following position equation:

[Expression 11]

$$p_n(k+1) = p_n(k) + T_{nb}s_b \quad (11)$$

In Expression 11, the following conditions are satisfied.

[Expression 12]

$$p_n = \begin{bmatrix} N \\ E \\ D \end{bmatrix} = \begin{bmatrix} \text{Northward distance} \\ \text{Eastward distance} \\ \text{Downward distance} \end{bmatrix} \quad (12a)$$

$$s_b = \begin{bmatrix} N_p L \\ 0 \\ 0 \end{bmatrix} \quad (12b)$$

where $T_{nb}$ represents a transform matrix for transforming from a vehicle fixed coordinate system to the NED coordinate system. Expression 12a shows a position vector, and Expression 12b shows a vehicle moving distance vector in the vehicle fixed coordinate system. In Expression 12b, $N_p$ represents the number of pulses per sample time, and L represents an interpulse distance.

However, Expression 12b cannot express the vehicle moving distance vector correctly because if a vehicle is driving up or down a slope while increasing/decreasing a pitch angle θ, a speed vector component appears in a vertical direction (z-axis direction in the vehicle fixed coordinate system) as well as a vehicle longitudinal direction (x-axis direction in the vehicle fixed coordinate system). Further, if a vehicle goes around a curve or skids, a yaw angle Y increases/decreases. If a vehicle is driving while increasing/decreasing the yaw angle Y, a speed vector component appears in a horizontal direction (y-axis direction in the vehicle fixed coordinate system) as well as the vehicle longitudinal direction (x-axis direction in the vehicle fixed coordinate system). Therefore, if a vehicle is driving while increasing/decreasing the pitch angle θ or the yaw angle Y, a speed vector component appears in the vertical direction (z-axis direction in the vehicle fixed coordinate system) or the horizontal direction (y-axis direction in the vehicle fixed coordinate system) as well as the vehicle longitudinal direction (x-axis direction in the vehicle fixed coordinate system). For that reason, Expression 12 cannot express the vehicle moving speed vector, and the dead reckoning calculating unit of the related art cannot calculate a state quantity (vehicle position and vehicle bearing) with high accuracy.

Further, a Kalman filter correcting unit 14 of the related art performs state quantity correction processing using a speed output from a vehicle speed sensor 11 as an observation value at 5 Hz under a normal driving condition, and then inputs the resultant value to the dead reckoning calculating unit 12. In the state quantity correction processing, the Kalman filter correcting unit 14 determines an observation value (measurement value) of a speed using the following measurement equation:

[Expression 13]

$$v_{xb\_obs} = v_{xb} + v_{vxb}$$

$$v_{yb\_obs} = v_{yb} + u_{vyb}$$

$$v_{zb\_obs} = v_{zb} + u_{vzb} \quad (13)$$

The Kalman filter correcting unit 14 determines $v_{xb}$ (longitudinal speed component in the vehicle fixed coordinate system) by dividing a vehicle speed interpulse distance by a pulse interval (time) and determines that $v_{yb}$ (lateral speed component in the vehicle fixed coordinate system)=0 and $v_{zb}$ (vertical speed component in the vehicle fixed coordinate system)=0.

Here, $u_{vxb}$, $u_{vyb}$, $u_{vzb}$ represents measured noise on an instant vehicle speed value, which is modeled by white noise.

Then, the Kalman filter correcting unit 14 obtains, by calculation, a corrected state quantity based on a difference between an observation value derived from Expression 13 and a calculation result from the dead reckoning calculating unit 12.

However, as described above, when the pitch angle θ or the yaw angle Y is changed, a speed vector component appears in the vertical and lateral directions as well as the vehicle longitudinal direction. Therefore, in the Kalman filter correcting unit 14 of the related art, an accurate observation value is not used, and a reliability of the obtained corrected state quantity is low. As a result, the dead reckoning calculating unit 12 cannot calculate a state quantity (vehicle position and vehicle bearing) with high accuracy.

(b) Summary of the Principle of the Invention

If a vehicle is driving while increasing/decreasing its pitch angle θ or yaw angle Y, each axial component of a vehicle moving speed vector $s_b$ is calculated based on the position equation in Expression 11 in consideration of the increase-decrease rate, and speed vectors ($v_{xb}$, $v_{yb}$, $v_{zb}$) are calculated based on the measurement equation in Expression 13.

Figure 1:
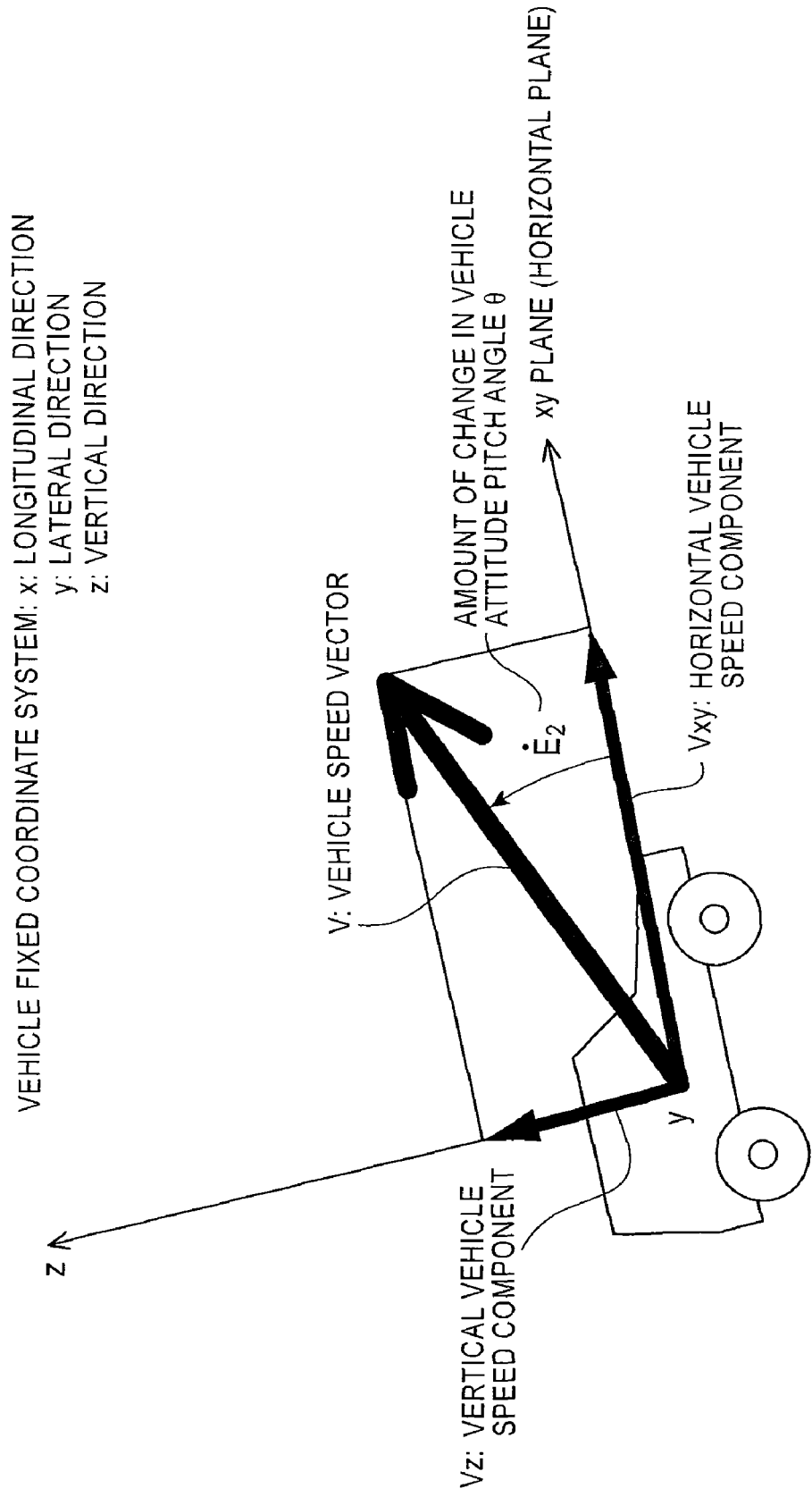
FIG. 1 is an expanded explanatory view of a vehicle speed vector V resolved into an xy-plane (horizontal plane) speed component $V_{xy}$ and a vertical (z-axis direction in a vehicle fixed coordinate system) speed component $V_z$.
Figure 2:
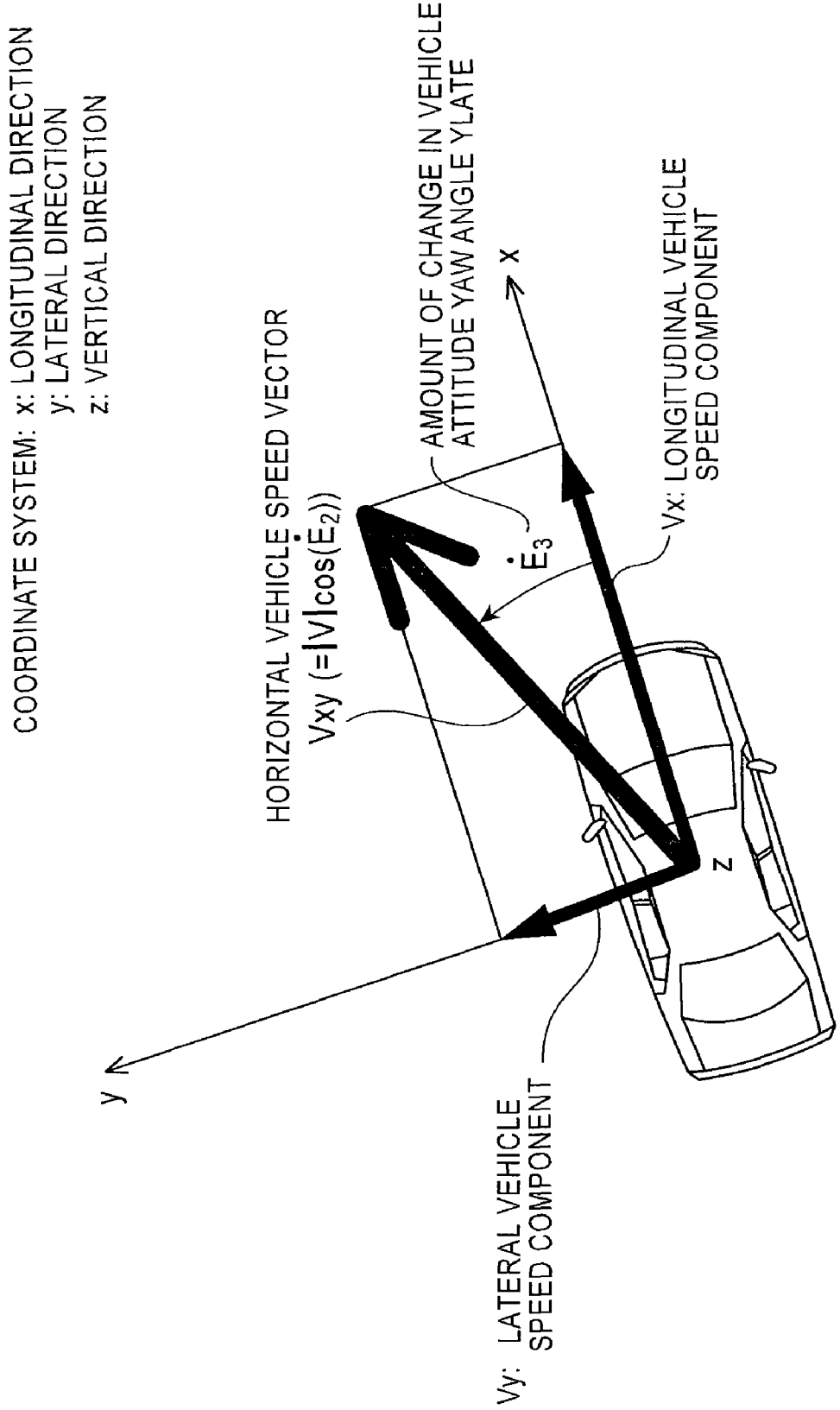
FIG. 2 is an expanded explanatory view of an xy-plane (horizontal plane) speed component $v_{xy}$ resolved into a longitudinal (x-axis direction in a vehicle fixed coordinate system) speed component $v_x$ and a lateral (y-axis direction in a vehicle fixed coordinate system) speed component $v_y$.

FIGS. 1 and 2 are expanded explanatory views showing how to resolve a vehicle speed. FIG. 1 is an explanatory view of how a vehicle speed vector V is resolved into an xy-plane (horizontal plane) speed component $v_{xy}$ and a vertical (z-axis direction in a vehicle fixed coordinate system) speed component $v_z$. FIG. 2 is an explanatory view of an xy-plane (horizontal plane) speed component $v_{xy}$ resolved into a longitudinal (x-axis direction in a vehicle fixed coordinate system) speed component $v_x$ and a lateral (y-axis direction in a vehicle fixed coordinate system) speed component $v_y$.

As shown in FIG. 1, in the case where a vehicle is driving while increasing/decreasing its pitch angle θ or yaw angle Y, if an amount of change in pitch angle θ is represented by $\dot{E}_2$, and a magnitude of a speed vector is represented by |V|, the xy-plane (vehicle horizontal plane) speed component $v_{xy}$ and the vertical (z-axis direction in a vehicle fixed coordinate system) speed component $v_z$ are expressed by the following expression:

[Expression 14]

$$v_{xy} = |V| \times \cos(\dot{E}_2)$$

$$v_z = |V| \times \sin(\dot{E}_2) \quad (14)$$

Further, as shown in FIG. 2, if an amount of change in yaw angle Y is expressed by $\dot{E}_3$, and a magnitude of a speed vector is represented by |V|, the longitudinal (x-axis direction in a vehicle fixed coordinate system) speed component $v_x$ and the lateral (y-axis direction in a vehicle fixed coordinate system) speed component $v_y$ are expressed by the following expression:

[Expression 15]

$$v_x = |v_{xy}| \times \cos(\dot{E}_3)$$

$$v_y = |v_{xy}| \times \sin(\dot{E}_3) \quad (15)$$

Substituting Expression 14 into Expression 15 gives the following expression:

[Expression 16]

$$v_x = |V| \times \cos(\dot{E}_2) \times \cos(\dot{E}_3)$$

$$v_y = |V| \times \cos(\dot{E}_2) \times \sin(\dot{E}_3)$$

$$v_z = |V| \times \sin(\dot{E}_2) \quad (16)$$

In view of the above, according to the present invention, the moving distance vector $s_b$ in the position equation in Expression 11 is as follows:

[Expression 17]

$$s_b = \begin{bmatrix} N_p L \times \cos(\dot{E}_2) \times \cos(\dot{E}_3) \\ N_p L \times \cos(\dot{E}_2) \times \sin(\dot{E}_3) \\ N_p L \times \sin(\dot{E}_2) \end{bmatrix} \quad (17)$$

To be specific, provided that a movement is represented by $N_p L$, the movement resolving unit resolves the movement into a vehicle longitudinal component, a vehicle lateral component, and a vehicle vertical component. Further, the measurement equation in Expression 13 is as follows:

[Expression 18]

$$v_{xb\_obs} = \text{instant vehicle speed value} \times \cos(\dot{E}_2) \times \cos(\dot{E}_3) + u_{vxb}$$

$$v_{yb\_obs} = \text{instant vehicle speed value} \times \cos(\dot{E}_2) \times \sin(\dot{E}_3) + u_{vyb}$$

$$v_{zb\_obs} = \text{instant vehicle speed value} \times \sin(\dot{E}_2) + u_{vzb} \quad (18)$$

In other words, an instant vehicle moving distance (measured moving speed V) is resolved into a vehicle longitudinal component $V_{xb}$-obs, a vehicle lateral component $V_{yb}$-obs, and a vehicle vertical component $V_{zb}$-obs based on the above expression.

(B) Navigation System (a) Overall Configuration

Figure 3:
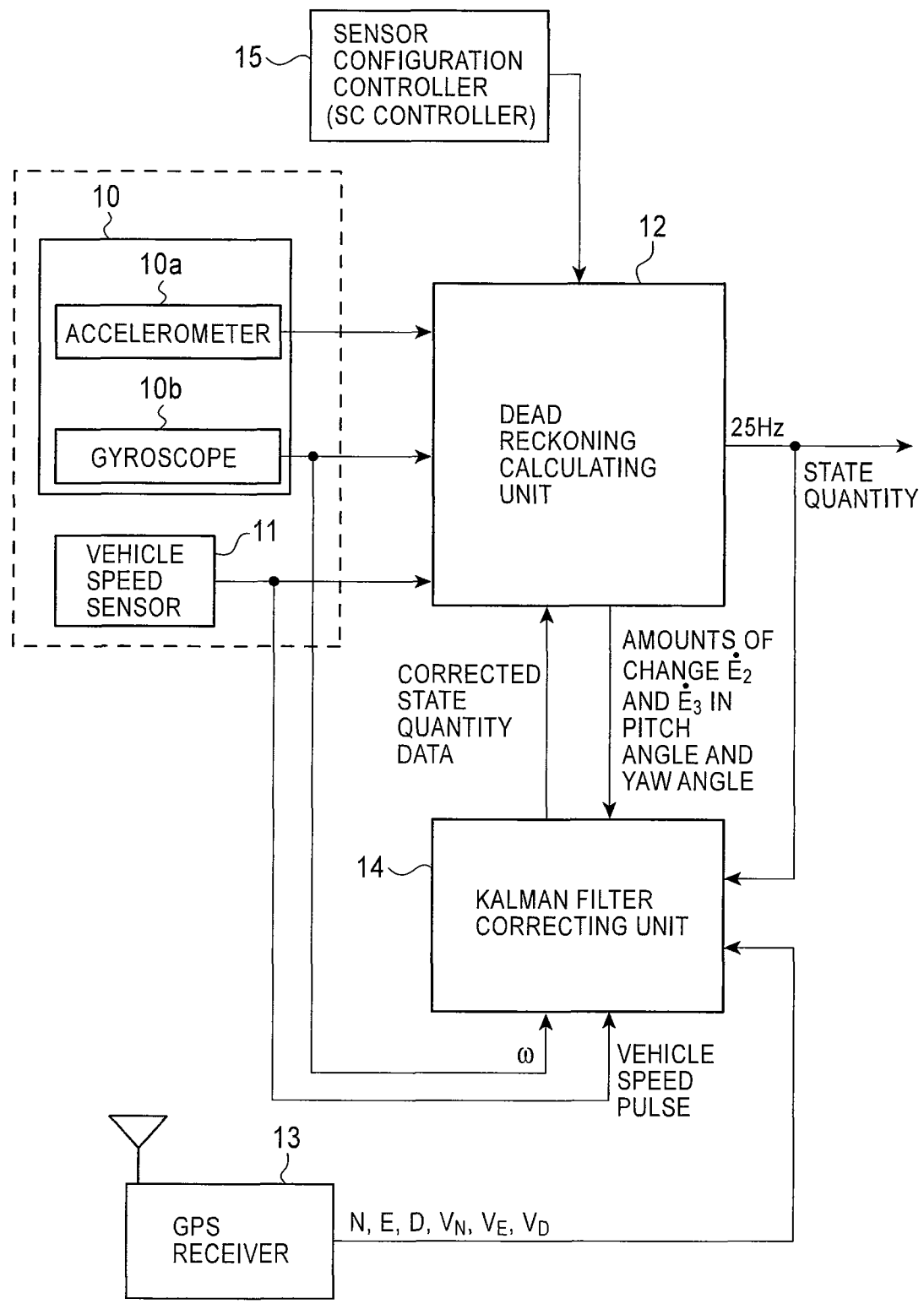
FIG. 3 is a diagram of the overall configuration of a navigation system according to the present invention.

FIG. 3 is a diagram of the overall configuration of a navigation system according to an embodiment of the present invention similar to FIG. 15. The same components as those in FIG. 15 are denoted by identical reference numerals.

An accelerometer 10*a* and a gyroscope 10*b* are provided on a sensor board 10. The accelerometer 10*a* may have one to three axes (Acc x, Acc y, Acc z) and the gyroscope 10*b* may have one to three axes (Gyro x, Gyro y, Gyro z). A system equipped with a triaxial accelerometer and a triaxial gyroscope is the basic system with six degrees of freedom.

A vehicle speed sensor 11 is designed to generate one pulse each time a vehicle travels a predetermined distance. The dead reckoning calculating unit 12 updates and outputs a vehicle state quantity inclusive of current vehicle position, speed, and attitude based on a predetermined computational expression using an algorithm of the basic system having six degrees of freedom at a high frequency, for example, 25 Hz. At the time of updating the vehicle state quantity, the dead reckoning calculating unit 12 calculates rates of change in pitch angle and yaw angle represented by $\dot{E}_2, \dot{E}_3$, and calculates the moving distance vector $s_b$ in the position equation using the resultant values based on Expression 17.

A sensor configuration controller (SC controller) 15 identifies the actual sensor configuration of an in-vehicle navigation system to estimate an output value of a sensor not included in the basic system to send the value to the dead reckoning calculating unit 12. A GPS receiver 13 receives, from each of plural artificial satellites, a signal regarding a distance and a rate of change in distance to input measured values of a position (latitude N, longitude E, height D) of an antenna of a vehicle and a vehicle speed (northward speed $V_N$, eastward speed $V_E$, vertical speed $V_D$) to the Kalman filter correcting unit 14 at 1 Hz.

The Kalman filter correcting unit 14 corrects a vehicle state quantity inclusive of current vehicle position, speed, and attitude at a predetermined frequency. More specifically, the Kalman filter correcting unit 14 performs state quantity correction processing using a speed output (during moving) from the vehicle speed sensor 11 or an angular velocity offset output (when stopped) from the gyroscope 10b as an observation value and then inputs the resultant value to the dead reckoning calculating unit 12, at 5 Hz. In correction processing during driving, the Kalman filter correcting unit 14 determines each axial velocity component in the vehicle fixed coordinate system based on Expression 18 using an increase-decrease rate in pitch angle and yaw angle calculated with the dead reckoning calculating unit 12.

Further, the Kalman filter correcting unit 14 inputs to the dead reckoning calculating unit 12 a corrected state quantity obtained by performing the state quantity correction processing using the position and speed (N, E, D, $v_N, v_E, v_D$) output from the GPS receiver 13 at 1 Hz.

(b) Dead Reckoning Calculating Unit

Figure 4:
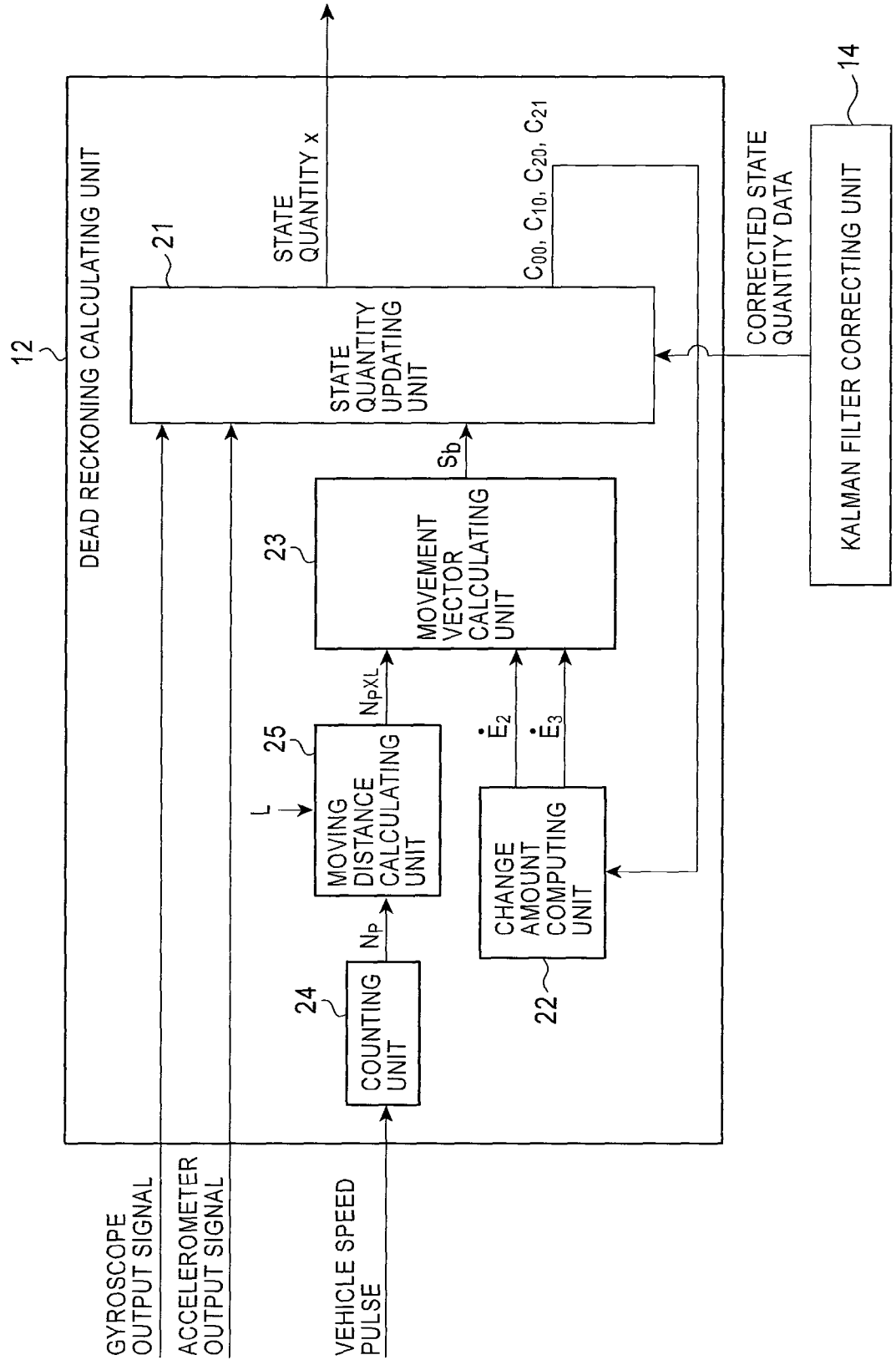
FIG. 4 is a diagram of a dead reckoning calculating unit.

FIG. 4 is a diagram of the dead reckoning calculating unit 12. A state quantity updating unit 21 updates and outputs a vehicle state quantity x inclusive of current vehicle position, speed, and attitude using an algorithm of the basic system having six degrees of freedom at 25 Hz as follows:

[Expression 19]

$$x=[v_{xs}, v_{ys}, v_{zs}, N, E, D, c_{00}, c_{10}, c_{20}, c_{21}, b_{wxs}, b_{wys}, b_{wzs}, b_{axs}, b_{ays}, b_{azs}, p_{00}, p_{10}, p_{20}, k_{\omega x}, k_{\omega y}, k_{\omega z}] \quad (19)$$

In addition, the state quantity updating unit 21 corrects a state quantity based on state quantity correction data input from the Kalman filter correcting unit 14 at a predetermined frequency. Here, $c_{00}, c_{10}, c_{20}, c_{21}$ of the state quantity represent an attitude parameter transformed from a sensor coordinate system to an NED coordinate system and can be expressed using a roll angle $E_1$, a pitch angle $E_2$, and a yaw angle $E_3$ as follows:

[Expression 20]

$$c_{00}=\cos(E_2)\times\cos(E_3)$$

$$c_{10}=\cos(E_2)\times\sin(E_3)$$

$$c_{20}=-\sin(E_2)$$

$$c_{21}=\sin(E_1)\times\cos(\dot{E}_2) \quad (20)$$

A change amount computing unit 22 derives the pitch angle $E_2$ and the yaw angle $E_3$ from Expression 20 at a state quantity calculation frequency (25 Hz) and determines change amounts $\dot{E}_2, \dot{E}_3$ in pitch angle and yaw angle and then inputs the determined amounts to a movement vector calculating unit 23. A counting unit 24 counts the number of vehicle speed pulses Np input from the vehicle speed sensor 11 during a period corresponding to the state quantity calculation frequency (25 Hz). A moving distance calculating unit 25 multiplies the number of vehicle speed pulses Np by a moving distance L per vehicle speed pulse to send a moving distance Np×L to the movement vector calculating unit 23. The movement vector calculating unit 23 derives a vehicle moving distance vector $s_b$ from Expression 17 to send the vector to the state quantity updating unit 21. The state quantity updating unit 21 calculates and outputs a vehicle state quantity inclusive of current vehicle position, speed, and attitude using sensor output signals corresponding to six axes input from the accelerometer 10a, the gyroscope 10b, and the SC controller 15 and the moving distance vector $s_b$.

(c) Kalman Filter Correcting Unit

Figure 5:
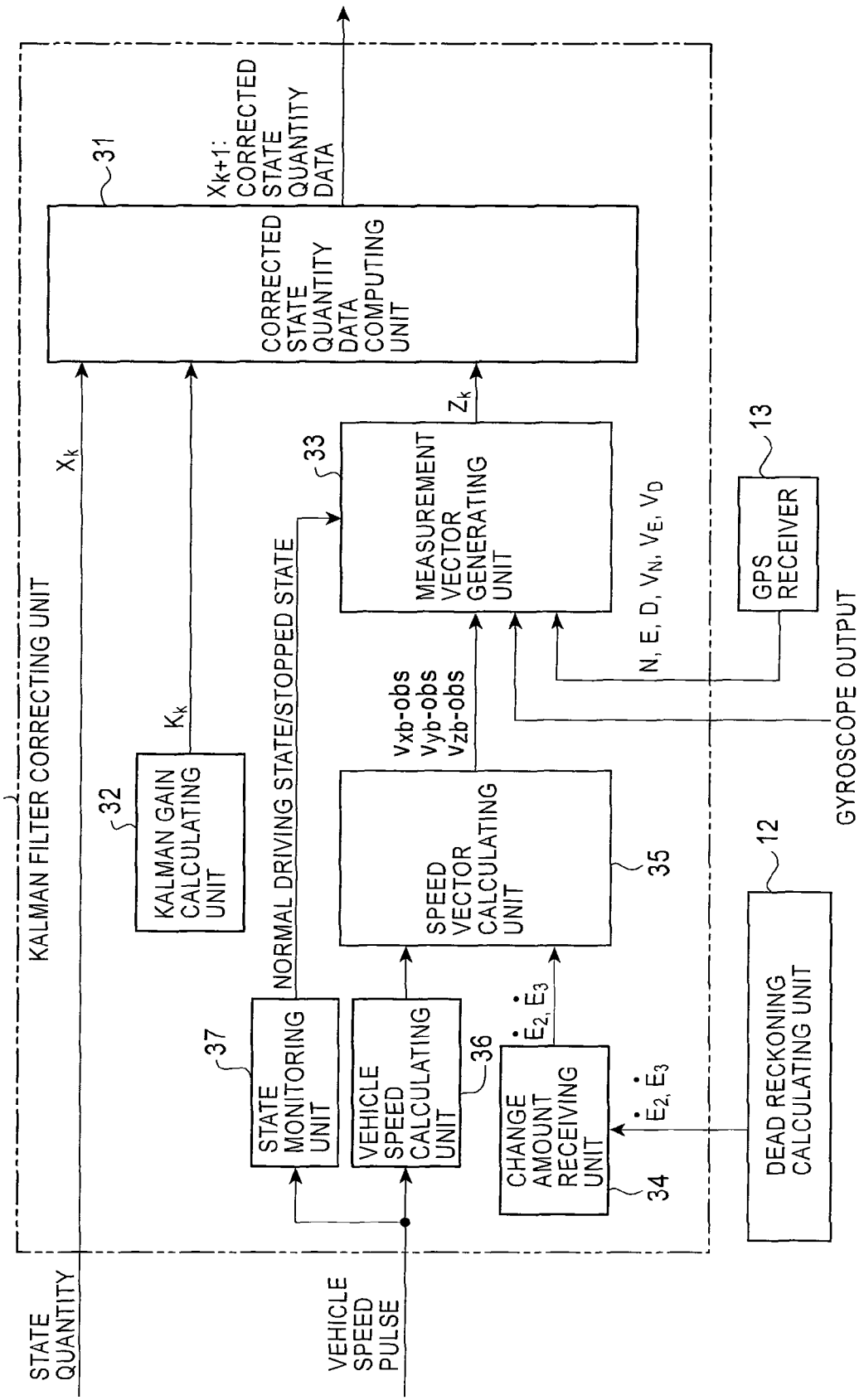
FIG. 5 is a diagram of a Kalman filter correcting unit.

FIG. 5 is a diagram of the Kalman filter correcting unit 14. A corrected state quantity data computing unit 31 determines a corrected state quantity using a state quantity $x_k$, a Kalman gain $K_k$, and a measurement vector $Z_k$ at a predetermined frequency and sends the calculated value to the dead reckoning calculating unit 12. A Kalman gain calculating unit 32 calculates the Kalman gain $K_k$ to send the calculated value to the corrected state quantity data computing unit 31. A measurement vector generating unit 33 generates a measurement vector $z_k$ at a predetermined frequency to send the vector to the corrected state quantity data computing unit 31.

A change amount receiving unit 34 receives amounts of change in pitch angle $E_2$ and the yaw angle $E_3$ calculated with the dead reckoning calculating unit 12 and sends the received values to a speed vector calculating unit 35. A vehicle speed calculating unit 36 calculates an instantaneous vehicle speed V by dividing a moving speed L per vehicle speed pulse by a pulse interval t to send the calculated value to the speed vector calculating unit 35. The speed vector calculating unit 35 calculates observation speed components $v_{xb}$-obs, $v_{yb}$-obs, and $v_{zb}$-obs of longitudinal, lateral, and vertical axes in the vehicle fixed coordinate system and then inputs the resultant values to the measurement vector generating unit 33. Here, an instantaneous vehicle speed value in Expression 18 is |V|. A state monitoring unit 37 monitors a vehicle state to determine whether the vehicle state is a normal driving state or a stopped state, and inputs a state signal to the measurement vector generating unit 33.

The measurement vector generating unit 33 generates a measurement vector $z_k$ using GPS reception signals N, E, D, $v_N, v_E$, and $v_D$ at 1 Hz. In the normal driving state, the measurement vector generating unit 33 generates a measurement vector $z_k$ using the observation speed components $v_{xb}$-obs, vyb-obs, and $v_{zb}$-obs of longitudinal, lateral, and vertical axes at 5 Hz. In the stopped state, the measurement vector generating unit 33 generates a measurement vector $z_k$ using gyroscope output signals corresponding to each axis. Then, the unit inputs the vector to the corrected state quantity data computing unit 31.

The corrected state quantity data computing unit 31 determines a corrected state quantity using the state quantity $x_k$, the Kalman gain $K_k$, and the measurement vector $z_k$ at a predetermined frequency based on a predetermined algorithm (as described later) and sends the corrected state data to the dead reckoning calculating unit 12.

(d) Advantages

Figure 7A:
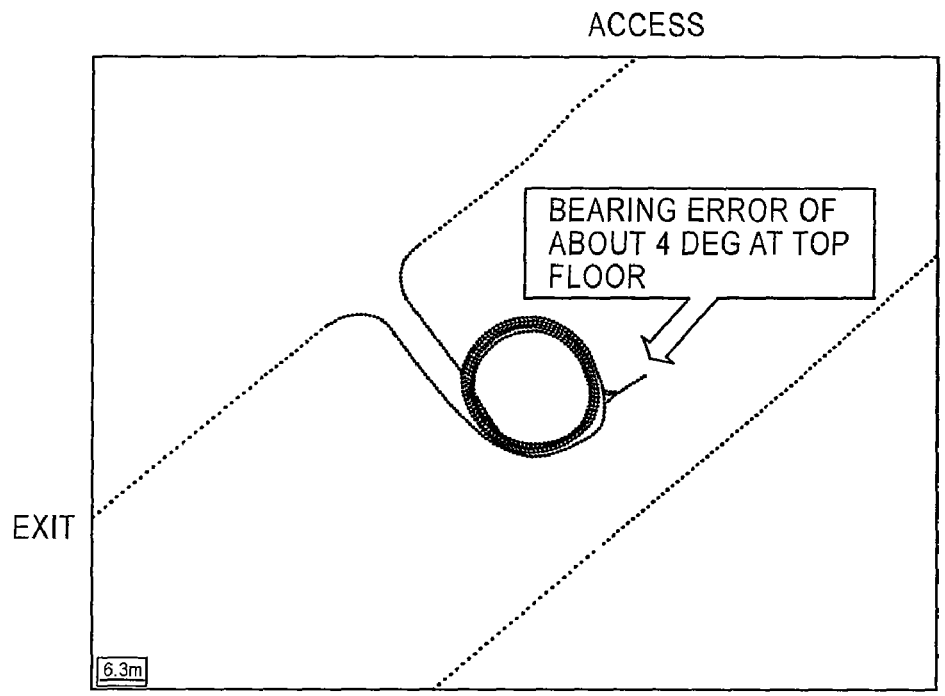
FIGS. 7A and 7B are explanatory views of a bearing error.
Figure 7B:
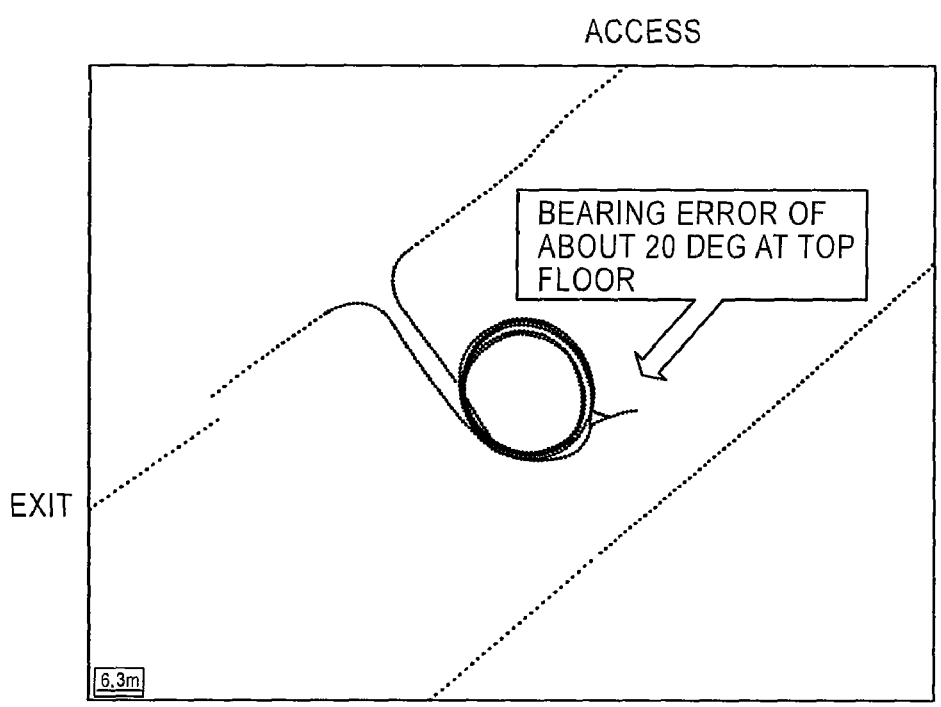

FIG. 6 is a table illustrating a result of an accuracy comparison between the related art and an embodiment of the present invention. FIGS. 7A and 7B are explanatory views of a bearing error. FIG. 8 is an explanatory view of a height difference. The table illustrating a result of an accuracy comparison in FIG. 6 shows (1) a bearing error (deg) between a road bearing and an estimated vehicle bearing in the case where a vehicle is stopped in parallel to the road at the top floor of a 10-story spiral parking structure out of GPS range and (2) a difference in estimated height (m) in the case where a vehicle enters the parking structure from a ground-floor entrance and drives up to the top floor and then returns to a ground-floor exit.

According to an embodiment of the present invention, even in a system equipped with a monoaxial accelerometer and a monoaxial gyroscope, the bearing error and the height difference are as small as 4 degrees (see FIG. 7A) and 2.16 m (see curve B in FIG. 8), and its accuracy is much higher than a conventional system equipped with a monoaxial accelerometer and a monoaxial gyroscope and is equivalent to the accuracy in a conventional system equipped with a triaxial accelerometer and a biaxial gyroscope. FIGS. 7A and 7B show a vehicular swept path. In the illustrated example, a vehicle enters a ground floor entrance in FIG. 7A and then drives up to the top floor of the 10-story spiral parking structure and parks in parallel to a road. After that, the vehicle returns to the ground-floor and exits in FIG. 7B. In FIGS. 7A and 7B, the dotted lines indicate a vehicular swept path in the case where a vehicle is parked in parallel to the road.

As described above, according to the embodiment of the present invention, the dead reckoning calculating unit 12 calculates a state quantity using the vehicle moving speed vector $s_b$ derived from Expression 17, making it possible to improve an accuracy of the moving distance vector and a positional accuracy.

Further, the Kalman filter correcting unit 14 generates the measurement vector $z_k$ using the observation speed components $v_{xb}$-obs, $v_{yb}$-obs, and $v_{zb}$-obs of longitudinal, lateral, and vertical axes at 5 Hz in the normal driving state, making it possible to improve an observation speed of each axis and an accuracy of a speed, a sensor attitude angle, and a sensor mounting angle. As a result, a relative height accuracy can be dramatically increased.

Thus, a positional accuracy and a bearing accuracy can be improved with the system configuration having fewer sensors. Hence, the cost of a navigation system can be reduced.

Moreover, a relative height accuracy can be improved and thus, the present invention is applicable to a determination unit for indicating a junction between an expressway and an open road under the expressway.

(e) MODIFIED EXAMPLE

In the above vehicle resolving method, amounts of change in both of the pitch angle and the yaw angle are taken into consideration, but a simplified method that considers only a sensor attitude yaw angle may be used instead for the following reason.

(1) In the case where a vehicle speed error is large (due to low-speed driving or a different way to receive pulses), an accuracy of estimation for a sensor attitude pitch angle is lowered or (2) a vehicle attitude angle is mainly determined by an amount of change in yaw angle, and an amount of change in pitch angle for a short time is almost zero.

For that reason, the dead reckoning calculating unit 12 calculates the vehicle moving speed vector $s_b$, based on the following expression in place of Expression 17.

[Expression 21]

$$s_b = \begin{bmatrix} N_p L \times \cos(\dot{E}_3) \\ N_p L \times \sin(\dot{E}_3) \\ 0 \end{bmatrix} \quad (21)$$

Then, the dead reckoning calculating unit 12 calculates a state quantity using the moving distance vector.

Further, the Kalman filter correcting unit 14 calculates the observation speed components $v_{xb}$-obs, $v_{yb}$-obs, and $v_{zb}$-obs of longitudinal, lateral, and vertical axes based on the following expression.

[Expression 22]

$v_{xb}\_obs$=instant vehicle speed value$\times\cos(\dot{E}_3)+u_{vxb}$ $v_{yb}\_obs$=instant vehicle speed value$\times\sin(\dot{E}_3)+u_{vyb}$ $v_{zb}\_obs=u_{vzb}$ \quad (22)

Then, the Kalman filter correcting unit 14 performs state quantity correction processing.

Figure 9:
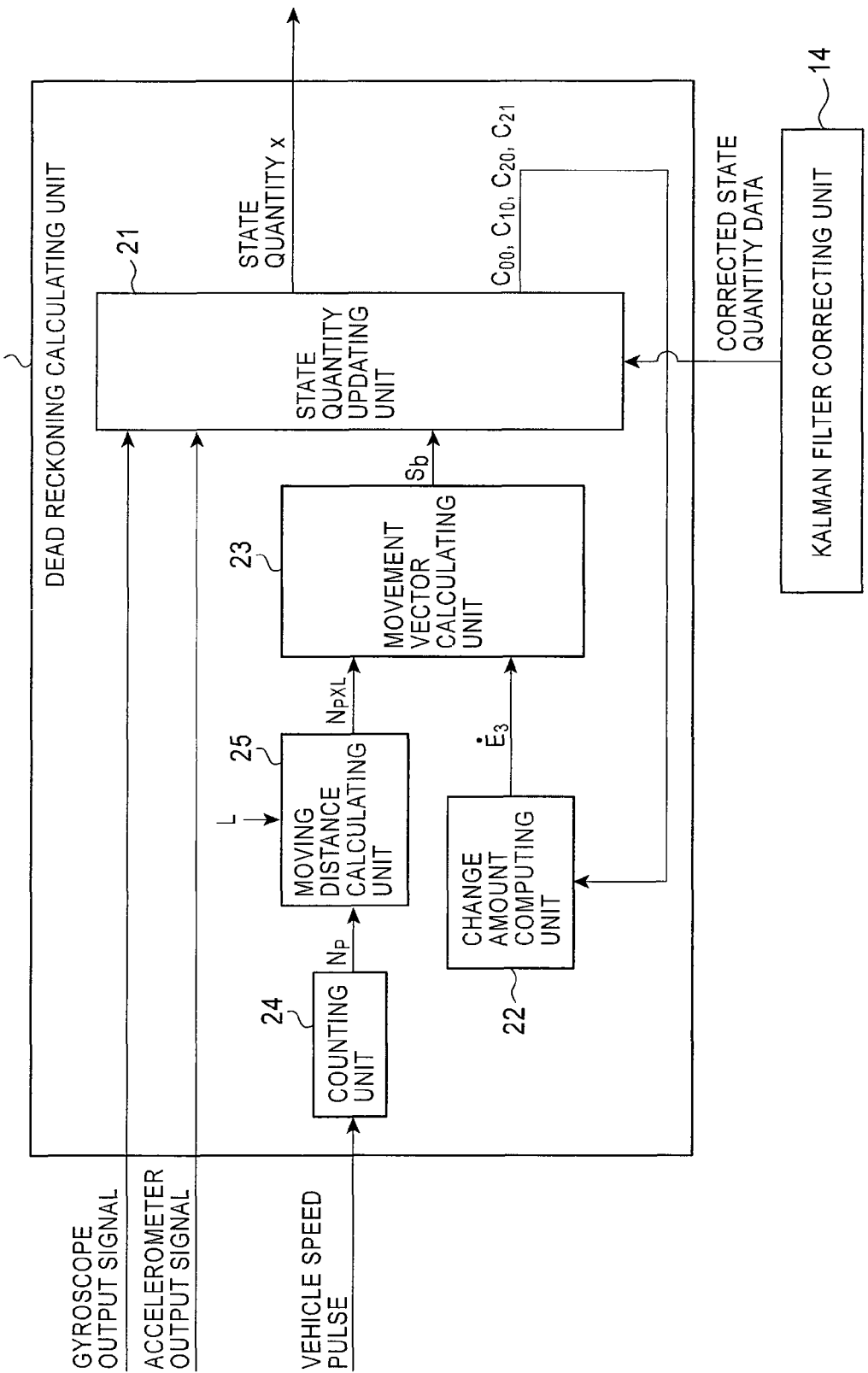
FIG. 9 is a modified example of the dead reckoning calculating unit.

FIG. 9 is a diagram of a modified example of the dead reckoning calculating unit 12. The modified example differs from the dead reckoning calculating unit 12 in FIG. 4 in that the change amount computing unit 22 calculates an amount of change in yaw angle alone and the movement vector calculating unit 23 derives the vehicle moving speed vector $s_b$ from Expression 21 to input the vector to the state quantity updating unit 21.

Figure 10:
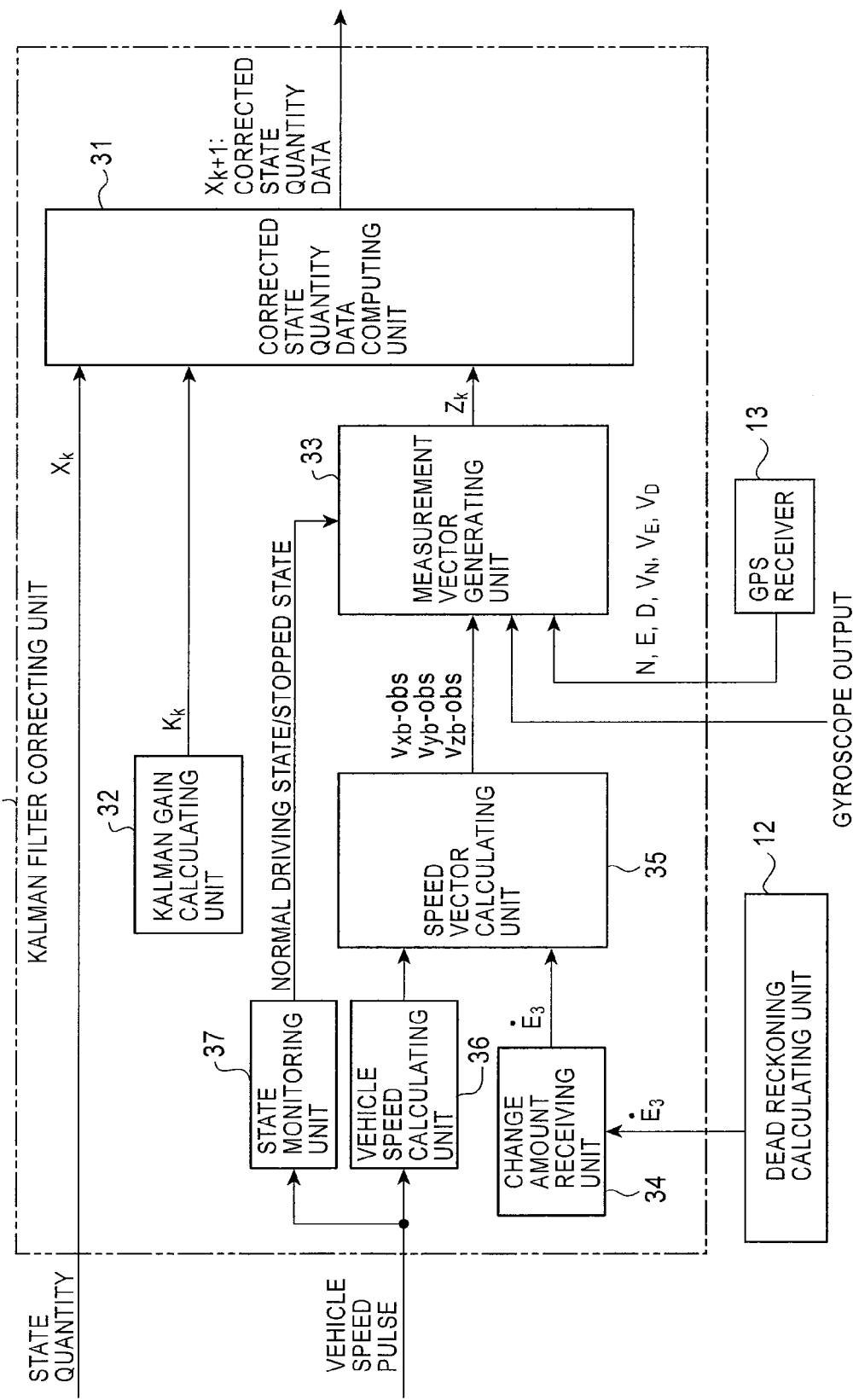
FIG. 10 is a modified example of the Kalman filter correcting unit.
Figure 14:
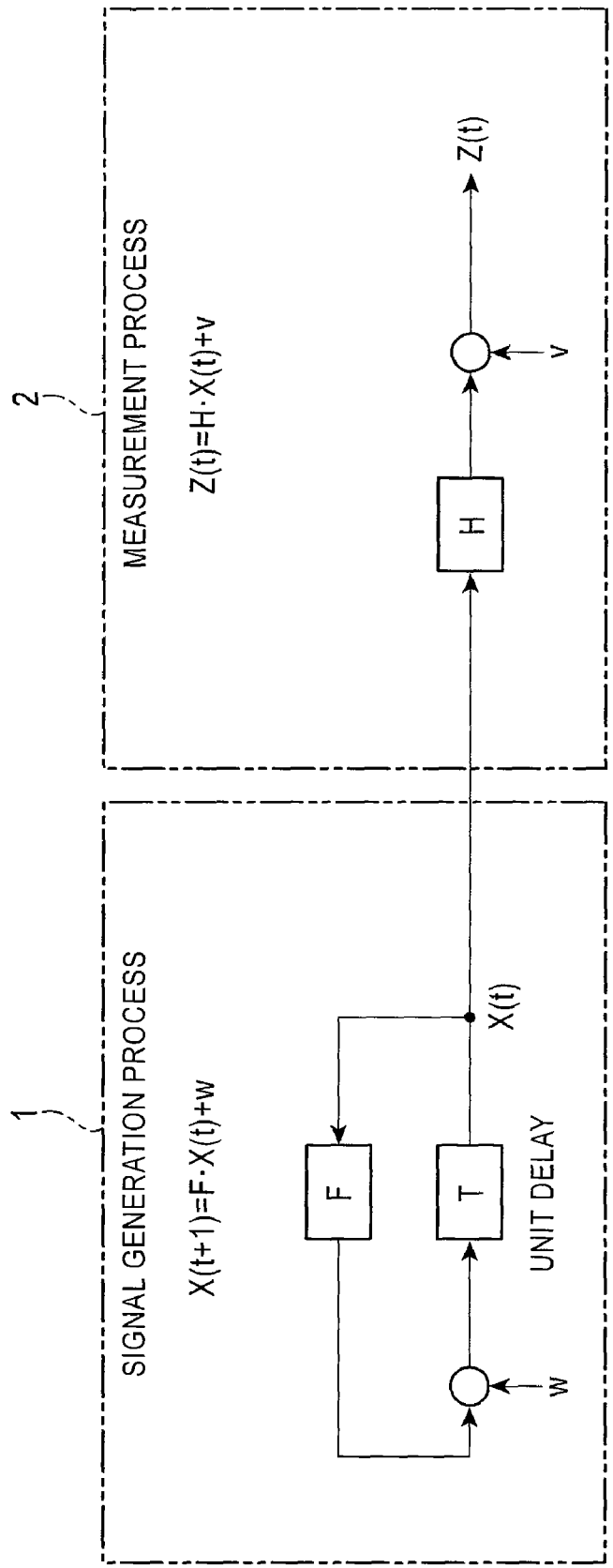
FIG. 14 is a schematic explanatory view of Kalman filter processing.

FIG. 10 is a diagram of a modified example of the Kalman filter correcting unit 14. The modified example differs from the Kalman filter correcting unit 14 in FIG. 5 in that the change amount receiving unit 34 receives an amount of change in yaw angle calculated with the dead reckoning calculating unit 12 to input the amount to the speed vector calculating unit 35, and the speed vector calculating unit 35 calculates the observation speed components $v_{xb}$-obs, $v_{yb}$-obs, and $v_{zb}$-obs of longitudinal, lateral, and vertical axes based on Expression 22 to input the calculated values to the measurement vector generating unit 33.

In the above example, the dead reckoning calculating algorithm in the dead reckoning calculating unit 12 or the calculating algorithm in the Kalman filter correcting unit 14 are not described in detail. The algorithms will be described in detail below.

(C) Dead Reckoning Calculating Algorithm in Dead Reckoning Calculating Unit

Hereafter, the dead reckoning calculating algorithm in the dead reckoning calculating unit is described. Prior to the description, it is assumed that in the following expressions, a variable with a dot like $\dot{v}_s$ represents a change of the variable $v_s$ with time.

(a) Speed Equation

A speed equation is expressed as follows:

[Expression 23]

$$\dot{v}_s = -\omega_s \times v_s + a_s + g_s \quad (23)$$

where

[Expression 24]

$$v_s = \begin{bmatrix} v_{xs} \\ v_{ys} \\ v_{zs} \end{bmatrix} \quad (24a)$$

$$\omega_s = \begin{bmatrix} P \\ Q \\ R \end{bmatrix} = K_\omega Vol_\omega \quad (24b)$$

$$a_s \quad (24c)$$

$$g_s \quad (24d)$$

Expression 24a shows a speed vector expressed by a sensor fixed coordinate system, Expression 24b shows a gyroscope output vector expressed by the sensor fixed coordinate system, and Expression 24d shows a gravity vector expressed by the sensor fixed coordinate system.

Here, the following conditions are satisfied:

[Expression 25]

$$K_\omega = \begin{bmatrix} k_{\omega x} & 0 & 0 \\ 0 & k_{\omega y} & 0 \\ 0 & 0 & k_{\omega z} \end{bmatrix} \quad (25)$$

$$Vol_\omega = \begin{bmatrix} vol_{\omega x} \\ vol_{\omega y} \\ vol_{\omega z} \end{bmatrix}$$

$k_{\omega x}$: sensitivity of $x_s$-axis gyroscope (rad/sec/Volt)
$k_{\omega y}$: sensitivity of $y_s$-axis gyroscope (rad/sec/Volt)
$k_{\omega z}$: sensitivity of $z_s$-axis gyroscope (rad/sec/Volt)
$vol_{\omega x}$: output of $x_s$-axis gyroscope (Volt)
$vol_{\omega y}$: output of $y_s$-axis gyroscope (Volt)
$vol_{\omega z}$: output of $z_s$-axis gyroscope (Volt)

In Expression 25, the "sensitivity" of the sensor means a constant of conversion from an output voltage of the sensor itself not influenced by a mounting angle or the like into a physical amount. A gyroscope sensitivity error largely influences bearing calculation in the navigation system. Thus, in this navigation system, a gyroscope sensitivity is included in a state quantity in Kalman filter and estimated/corrected all the time.

(b) Attitude Equation

An attitude equation can be expressed by the following expression:

[Expression 26]

$$\dot{c}_{00} = c_{01}\omega_{zs} - c_{02}\omega_{ys}$$

$$\dot{c}_{10} = c_{11}\omega_{zs} - c_{12}\omega_{ys}$$

$$\dot{c}_{20} = c_{21}\omega_{zs} - c_{02}\omega_{ys}$$

$$\dot{c}_{21} = c_{20}\omega_{zs} - c_{22}\omega_{xs} \quad (26)$$

In Expression 26, the following matrix is a transform matrix for transforming from the sensor coordinate system to the NED coordinate system:

[Expression 26a]

$$\begin{bmatrix} c_{00} & c_{01} & c_{02} \\ c_{10} & c_{11} & c_{12} \\ c_{20} & c_{21} & c_{22} \end{bmatrix} = T_{ns} \quad (26a)$$

In Expression 26a, parameters $c_{00}$, $c_{10}$, $c_{20}$, and $c_{21}$ can be expressed by a pitch angel and a yaw angle as shown in Expression 20.

Expression 26 is given by extracting four independent parameters when applied to a vehicle navigation system from the following attitude equation as a general process of an inertial navigation system (INS):

[Expression 27]

$$\dot{T}_{ns} = T_{ns} \begin{bmatrix} 0 & -\omega_{zs} & \omega_{ys} \\ \omega_{zs} & 0 & -\omega_{xs} \\ -\omega_{ys} & \omega_{xs} & 0 \end{bmatrix} \quad (27)$$

(c) Position Equation

A position equation can be expressed by the following expression:

[Expression 28]

$$p_n(k+1) = p_n(k) + T_{nb}s_b \quad (28)$$

In Expression 28, $T_{nb}$ represents a transform matrix for transforming from the vehicle fixed coordinate system to the NED coordinate system. In addition, in Expression 28, the following conditions are satisfied:

[Expression 29]

$$p_n = \begin{bmatrix} N \\ E \\ D \end{bmatrix} = \begin{bmatrix} \text{Northward distance} \\ \text{Eastward distance} \\ \text{Downward distance} \end{bmatrix} \quad (29a)$$

$$s_b = \begin{bmatrix} N_p L \times \cos(\dot{E}_2) \times \cos(\dot{E}_3) \\ N_p L \times \cos(\dot{E}_2) \times \sin(\dot{E}_3) \\ N_p L \times \sin(\dot{E}_2) \end{bmatrix} \quad (29b)$$

Expression 29a shows a positional vector and Expression 29b shows a vehicle moving distance vector. Further, In Expression 29b, Np represents the number of pulses per sample time, and L represents an interpulse distance.

(d) Fixed Parameter Equation
A fixed parameter equation is as follows:

[Expression 30]

$$\dot{b}_{\omega xs} = 0$$
$$\dot{b}_{\omega ys} = 0$$
$$\dot{b}_{\omega zs} = 0$$
$$\dot{b}_{axs} = 0$$
$$\dot{b}_{ays} = 0$$
$$\dot{b}_{azs} = 0$$
$$\dot{p}_{00} = 0$$
$$\dot{p}_{10} = 0$$
$$\dot{p}_{20} = 0$$
$$\dot{k}_{\omega x} = 0$$
$$\dot{k}_{\omega y} = 0$$
$$\dot{k}_{\omega z} = 0$$

(30)

where

[Expression 31]

$$\begin{bmatrix} b_{\omega xs} \\ b_{\omega ys} \\ b_{\omega zs} \end{bmatrix} \quad (31a)$$

$$\begin{bmatrix} b_{axs} \\ b_{ays} \\ b_{azs} \end{bmatrix} \quad (31b)$$

$$\begin{bmatrix} k_{\omega x} \\ k_{\omega y} \\ k_{\omega z} \end{bmatrix} \quad (31c)$$

$$\begin{bmatrix} p_{00} & p_{01} & p_{02} \\ p_{10} & p_{11} & p_{12} \\ p_{20} & p_{21} & p_{22} \end{bmatrix} = T_{vs} \quad (31d)$$

Expression 31a shows a bias (Volt) included in a gyroscope output in the sensor coordinate system, Expression 31b shows a bias (m/s$^2$) included in an accelerometer output in the sensor coordinate system, Expression 31c shows a sensitivity (rad/sec/Volt) of a gyroscope output included in an accelerometer output in the sensor coordinate system, and Expression 31D shows a transform matrix for transforming from the sensor coordinate system to the vehicle coordinate system. Further, in Expression 31, $p_{00}$, $p_{10}$, and $p_{20}$ are three independent parameters extracted from elements of a matrix of the mounting angle.

(e) Nonlinear State Equation
Expressions 23, 26, 28, and 30 can be simplified into a determinant as follows:

[Expression 32]

$$\dot{x} = f(x, \omega_s, a_s) \quad (32)$$

where x represents a nonlinear state quantity vector expressed as follows:

[Expression 32a]

$$x = [v_{xs}, v_{ys}, v_{zs}, N, E, D, c_{00}, c_{10}, c_{20}, c_{21}, b_{\omega xs}, b_{\omega ys}, b_{\omega xs}, b_{axs}, b_{ays}, b_{azs}, p_{00}, p_{10}, p_{20}, k_{\omega x}, k_{\omega y}, k_{\omega z}] \quad (32a)$$

(f) State Quantity Updating
Expression (32) can be numerically integrated on a CPU using, for example, the following state quantity update equation:

[Expression 33]

$$X_{k+1} = X_k + f(x_k, \omega_{s,k}, a_{s,k})T \quad (33)$$

If a high accuracy is required, a quartic equation based on the well-known Runge-Kutta numeric integration method (see the following cited document) may be used. Kreyszig, E., Advanced Engineering Mathematics, John Wiley & Sons, 1999, New York, N.Y.

Here, In Expression 33, T represents a sample time. For example, T=0.04 sec at 25 Hz. The above description is directed to an in-vehicle inertial navigation system that is obtained based on the method used in a general inertial navigation system. In the system, minor parameters such as the roundness of the Earth (see the following cited document) are simplified in consideration of a MEMS sensor. Hoshizaki, T., Computational Scheme For MEMS inertial Navigation Systems, AOAMR Patent, August, 2006.

(g) Small Disturbance Equation
In order to correct the state quantity x through Kalman filter processing with the Kalman filter correcting unit 14 based on a measurement value from a GPS receiver or the like, the dead reckoning calculating unit 12 needs to update the state quantity based on the nonlinear state equation and in addition, update a covariance value of an error amount (small disturbance) on the assumption that the error amount is increased in the linear equation. To that end, Expression (29) is linearized and the following determinant as the small disturbance equation is prepared:

[Expression 34]

$$\delta x_{k+1} = F(\hat{x}_k)\delta x_k + G_k(\hat{x}_k)w_k \quad (34)$$

where $\delta x$ represents a small disturbance vector expressed as follows:

[Expression 35]

$$\delta x = [\delta v_{xs}, \delta v_{ys}, \delta v_{zs}, \delta N, \delta E, \delta D, \delta\alpha, \delta\beta, \delta\gamma, b_{\omega xs},$$
$$b_{\omega ys}, b_{\omega zs}, b_{axs}, b_{ays}, b_{azs}, \delta b, \delta c, \delta k_{\omega x}, \delta k_{\omega y}, \delta k_{\omega z}] \quad (35a)$$

$$\hat{x}_k \quad (35b)$$

$$w_k = \begin{bmatrix} w_{\omega k} \\ w_{ak} \end{bmatrix} = \begin{bmatrix} w_{\omega xs} \\ w_{\omega ys} \\ w_{\omega zs} \\ w_{axs} \\ w_{ays} \\ w_{azs} \end{bmatrix} \quad (35c)$$

where Expression 35b shows a current estimated value of $x_k$, and Expression 35c shows RF noise on a triaxial gyroscope output $\omega_s$ that is modeled using white noise, and RF noise on a triaxial accelerometer output $a_s$. A standard deviation ($\sigma$) of each noise is determined based on the sensor specification or by measurement. In this example, a level of each noise is expressed by N as follows:

[Expression 36]

$$\sigma w \omega xs = N_{w\omega xs}$$

$$\sigma w \omega ys = N_{w\omega ys}$$

$$\sigma w \omega zs = N_{w\omega zs}$$

σwaxs=N_{waxs}

σways=N_{ways}

σwazs=N_{wazs} (36)

δα, δβ, and δγ represent small disturbances of $c_{00}$, $c_{10}$, $c_{20}$, and $c_{21}$, and δα, δβ, and δγ and $\delta c_{00}$, $\delta c_{10}$, $\delta c_{20}$, and $\delta c_{21}$ have the following relationship based on a general method of the inertial navigation system (INS):

[Expression 37]

$$\begin{bmatrix} \delta c_{00} & \delta c_{01} & \delta c_{02} \\ \delta c_{10} & \delta c_{11} & \delta c_{12} \\ \delta c_{20} & \delta c_{21} & \delta c_{22} \end{bmatrix} = - \begin{bmatrix} 0 & -\delta\gamma & \delta\beta \\ \delta\gamma & 0 & -\delta\alpha \\ -\delta\beta & \delta\alpha & 0 \end{bmatrix} \begin{bmatrix} c_{00} & c_{01} & c_{02} \\ c_{10} & c_{11} & c_{12} \\ c_{20} & c_{21} & c_{22} \end{bmatrix} \quad (37)$$

δb and δc represent small disturbances of $p_{00}$, $p_{10}$, and $p_{20}$ and have the following relationship based on a general method of the inertial navigation system (INS):

[Expression 38]

$$\begin{bmatrix} \delta p_{00} & \delta p_{01} & \delta p_{02} \\ \delta p_{10} & \delta p_{11} & \delta p_{12} \\ \delta p_{20} & \delta p_{21} & \delta p_{22} \end{bmatrix} = - \begin{bmatrix} 0 & -\delta c & \delta b \\ \delta c & 0 & -\delta a \\ -\delta b & \delta a & 0 \end{bmatrix} \begin{bmatrix} p_{00} & p_{01} & p_{02} \\ p_{10} & p_{11} & p_{12} \\ p_{20} & p_{21} & p_{22} \end{bmatrix} \quad (38)$$

Provided that a sensor mounting roll angle relative to a vehicle is 0, a correction amount of the mounting angle is as follows:

δa=0

The matrixes $F(\hat{x}_k)$ and $G_k(\hat{x}_k)$ representing a linear system in Expression 34 are obtained as shown in FIGS. 11 and 12, respectively. In FIG. 11, the following conditions are satisfied:

[Expression 39]

$$I = \begin{bmatrix} 1 & 0 & 0 \\ 0 & 1 & 0 \\ 0 & 0 & 1 \end{bmatrix} : n \times n \text{ unit matrix} \quad (39a)$$

$$g_n = \begin{bmatrix} 0 \\ 0 \\ 9.8 \text{ m/s}^2 \end{bmatrix} : \text{gravitational} \quad (39b)$$

acceleration vector of NED coordinate system $$Rot(a) = \begin{bmatrix} 0 & -a_z & a_y \\ a_z & 0 & -a_x \\ -a_y & a_x & 0 \end{bmatrix} \quad (39c)$$

where $$a = \begin{bmatrix} a_x \\ a_y \\ a_z \end{bmatrix} :$$

:matrix of 3×1 vector elements
â: hat mark (^) represents a current estimate value
T: sample time (h) Covariance Updating A covariance matrix (error covariance matrix) of the small disturbance δx is updated following a formula for the Kalman filter processing using the obtained matrixes $F(\hat{x}_k)$ and $G_k(\hat{x}_k)$ based on the following expression:

[Expression 40]

$$P_{k+1}^- = F_k P_k^- F_k^T + G_k Q_k G_k^T \quad (40)$$

where an upper right character T indicates matrix transpose, "−" indicates an uncorrected state in the Kalman filter processing, and "+" indicates a corrected state in the Kalman filter processing. Further, $P_k$ represents a covariance matrix including an expected valve (E[ ]) of a correlation value of $\delta x_k$, and $Q_k$ represents a covariance matrix including an expected valve (E[ ]) of a correlation value $w_k$. The matrices are expressed as follows:

[Expression 41]

$$P_k = E[\delta x_k \; \delta x_k^T] = \begin{bmatrix} E[\delta v_{xs}\delta v_{xs}] & E[\delta v_{xs}\delta v_{ys}] & E[\delta v_{xs}\delta v_{zs}] \\ E[\delta v_{ys}\delta v_{xs}] & E[\delta v_{ys}\delta v_{ys}] & E[\delta v_{ys}\delta v_{zs}] & \cdots \\ E[\delta v_{zs}\delta v_{xs}] & E[\delta v_{zs}\delta v_{ys}] & E[\delta v_{zs}\delta v_{zs}] \\ & \vdots & & \ddots \end{bmatrix} \quad (41a)$$

$$Q_k = E[w_k \; w_k^T] = \begin{bmatrix} N_{\omega xs}^2 & 0 & 0 & 0 & 0 & 0 \\ 0 & N_{\omega ys}^2 & 0 & 0 & 0 & 0 \\ 0 & 0 & N_{\omega zs}^2 & 0 & 0 & 0 \\ 0 & 0 & 0 & N_{axs}^2 & 0 & 0 \\ 0 & 0 & 0 & 0 & N_{ays}^2 & 0 \\ 0 & 0 & 0 & 0 & 0 & N_{azs}^2 \end{bmatrix} \quad (41b)$$

Expressions 33 and 40 above are expressions of computation executed with the dead reckoning calculating unit 12 in the basic system having six degrees of freedom at a high frequency (for example, 25 Hz). Expressions 33 and 40 are given again below.

[Expression 42]

$x_{k+1} = x_k + f(x_k, \omega_{s,k}, a_{s,k})T$ :(33) State quantity updating expression $P_{k+1}^- = F_k P_k^- F_k^T + G_k Q_k G_k^T$ :(40) Covariance updating expression (D) Calculation with Kalman Filter Computing Unit Next, a calculation method of the dead reckoning calculating unit 12, which is executed along with low-frequency measurement value input, is described. In the following equation, $u_{vvb}$ represents measurement noise modeled using white noise, and its standard deviation is expressed like $\sigma_{vyb}$.

(a) Normal Driving State

In a normal driving state, the following measurement equation is used.

[Expression 43]

$v_{xb\_obs}$=instant vehicle speed value×cos($\dot{E}_2$)×cos ($\dot{E}_3$)+$u_{vxb}$ $v_{yb\_obs}$=instant vehicle speed value×cos($\dot{E}_2$)×sin ($\dot{E}_3$)+$u_{vyb}$ $v_{zb\_obs}$=instant vehicle speed value×sin($\dot{E}_2$)+$u_{vzb}$ (43)

where the instant vehicle speed value is obtained by dividing the vehicle interpulse distance L by the pulse interval (time). A standard deviation thereof is, for example, as follows:

$$\sigma_{vxb}=0.25 \text{ m/s}, \sigma_{vyb}=0.2 \text{ m/s}, \sigma_{vzb}=0.06 \text{ m/s}$$

Here, the above values are design values as a rough standard.

(b) Stopped State

If a vehicle speed pulse has not been input for 2 seconds or more, a vehicle is determined to be stopped. In the stopped state, measurement values and standard deviation thereof are as follows:

$$V_{xb\_}obs=0 \; \sigma_{vxb}=0.25 \text{ m/s}$$

$$v_{yb\_}obs=0 \; \sigma_{vyb}=0.2 \text{ m/s}$$

$$v_{zb\_}obs=0 \; \sigma_{vzb}=0.06 \text{ m/s}$$

In addition, the following measurement equations are used:

[Expression 44]

$$b_{\omega xs\_}obs=b_{\omega xs}+u_{b\omega xs}$$

$$b_{\omega ys\_}obs=b_{\omega ys}+u_{b\omega ys}$$

$$b_{\omega zs\_}obs=b_{\omega zs}+u_{b\omega zs}$$

where $$b_{\omega xs\_}obs=P \; \sigma_{b\omega xs}N_{\omega xs}$$

$$b_{\omega ys\_}obs=Q \; \sigma_{b\omega ys}N_{\omega ys}$$

$$b_{\omega zs\_}obs=R \; \sigma_{b\omega zs}N_{\omega zs} \quad (44)$$

(c) GPS Receiver Measurement State

If the following GPS receiver measurement values are obtained, the following GPS receiver measurement result is used in addition to a result of determining whether a vehicle state is the normal driving state or the stopped state.

[Expression 45]

$$N\_obs=N+u_N$$

$$E\_obs=E+u_E$$

$$D\_obs=D+u_D$$

$$v_N\_obs=v_N+u_{vN}$$

$$v_E\_obs=v_E+u_{vE}$$

$$v_D\_obs=v_D+u_{vD} \quad (45)$$

Here, the measurement values and measurement error standard deviation are received from a GPS receiver.

Further, in a system equipped with a monoaxial accelerometer and a monoaxial gyroscope, the SC controller 15 estimates an output value of a sensor not included in the basic system to input the estimated value to the dead reckoning calculating unit 12. In such a case, the SC controller 15 inputs a measured amount (roll angle=0) to the Kalman filter correcting unit 14. If information about the roll angle=0 is sent, the Kalman filter correcting unit 14 uses the following measurement equation:

[Expression 46]

$$c_{21}\_obs=c_{21}+u_{c21}$$

where $$c_{21}=0, \sigma_{c21}=0.02 \quad (46)$$

This is because $c_{21}$=sin(sensor roll angle)·cos(sensor pitch angle), and if $c_{21}$=0 is satisfied, the roll angle=θ is automatically satisfied.

(d) Nonlinear Measurement Equation

Expressions 43 to 46 can be simplified into a determinant expressed by the following nonlinear measurement equation (Expression 47):

[Expression 47]

$$z_k=h_k(x_k)+u_k \quad (47)$$

where the measurement vector z is expressed as follows:

[Expression 48]

$$z_k=[v_{xb\_}obs, v_{yb\_}obs, v_{zb\_}obs, b_{\omega xs\_}obs, b_{\omega ys\_}obs,$$
$$b_{\omega zs\_}obs, N\_obs, E\_obs, D\_obs, v\_obs, v_E\_obs,$$
$$v_D\_obs, c_{21}\_obs] \quad (48)$$

(e) Linear Measurement Equation (Kalman Filter Observation Formula)

Linearizing Expression 47 to subject vector values to the Kalman filter gives the following linear measurement equation (Kalman Filter Observation Formula):

[Expression 49]

$$\delta z_k=H(\hat{x}_k)\delta x_k+u_k \quad (49)$$

Where a small disturbance measurement vector δz is given as follows:

[Expression 50]

$$\delta z_k=[\delta v_{xb\_}obs, \delta v_{yb\_}obs, \delta v_{zb\_}obs, b_{\omega xs\_}obs, b_{\omega ys\_}$$
$$obs, b_{\omega zs\_}obs, \delta N\_obs, \delta E\_obs, \delta D\_obs,$$
$$\delta v\_obs, \delta v_E\_obs, \delta v_D\_obs, \delta c_{21}\_obs] \quad (50)$$

Further, a matrix (observation matrix) $H(\hat{x}_k)$ is obtained as shown in FIG. 13. In the normal driving state, rows (1) in the matrix in FIG. 13 are used as an observation matrix, and in the stopped state, rows (1) and (2) are used as an observation matrix. If a measurement value of the GPS receiver is additionally obtained, rows (1) and (2) together with rows (3) are used as an observation matrix (see Japanese Unexamined Patent Application Publication No. 2007-233515). Further, rows (4) are added in accordance with the sensor configuration.

When the measurement values are obtained, iterative calculation of Expressions 51 to 53 below is calculated until a predetermined condition is satisfied.

[Expression 51]

$$K_{k,i}=P_k^-H_k^T(\hat{x}_{k,i}^+)H_k(\hat{x}_{k,i}^+)P_k^-H_k^T(\hat{x}_{k,i}^+)+R_k)^{-1} \text{ Calculation of Kalman gain} \quad (51)$$

[Expression 52]

$$\hat{x}_{k,i+1}^+=\hat{x}_k^-+K_{k,i}[z_k-h_k(\hat{x}_{k,i}^+)-H_k(\hat{x}_{k,i}^+)(\hat{x}_k^--\hat{x}_{k,i}^+)] \text{ Correction of state quantity} \quad (52)$$

[Expression 53]

$$P_{k,i+1}^+=(I-K_{k,i}H_k(\hat{x}_{k,i}^+))P_k^- \text{ Correction of state quantity covariance} \quad (53)$$

In the above expressions, the following condition is satisfied:

[Expression 54]

$$\hat{x}_{k,0}^+=\hat{x}_k^- \quad (54)$$

Further, $R_k$ represents a covariance matrix for the measurement value, which varies depending on $H_k$. In other words, in the normal driving state, the covariance matrix is expressed by Expression 55a and in the stopped state, expressed by Expression 55b.

[Expression 55]

$$R_k = \begin{bmatrix} \sigma_{vxv}^2 & 0 & 0 \\ 0 & \sigma_{vyv}^2 & 0 \\ 0 & 0 & \sigma_{vzv}^2 \end{bmatrix} \quad (55a)$$

$$R_k = \begin{bmatrix} \sigma_{vxv}^2 & 0 & 0 & 0 & 0 & 0 \\ 0 & \sigma_{vyv}^2 & 0 & 0 & 0 & 0 \\ 0 & 0 & \sigma_{vzv}^2 & 0 & 0 & 0 \\ 0 & 0 & 0 & N_{\omega xb}^2 & 0 & 0 \\ 0 & 0 & 0 & 0 & N_{\omega yb}^2 & 0 \\ 0 & 0 & 0 & 0 & 0 & N_{\omega zb}^2 \end{bmatrix} \quad (55b)$$

If measurement values of the GPS receiver are obtained, in addition to the above vehicle state, a covariance regarding a measurement error of the GPS receiver is added as follows:

[Expression 56]

$$R_k = \begin{bmatrix} \ddots & \vdots & \vdots & \vdots & \vdots & \vdots & \vdots \\ \cdots & \sigma_N^2 & 0 & 0 & 0 & 0 & 0 \\ \cdots & 0 & \sigma_E^2 & 0 & 0 & 0 & 0 \\ \cdots & 0 & 0 & \sigma_D^2 & 0 & 0 & 0 \\ \cdots & 0 & 0 & 0 & \sigma_{vN}^2 & 0 & 0 \\ \cdots & 0 & 0 & 0 & 0 & \sigma_{vE}^2 & 0 \\ \cdots & 0 & 0 & 0 & 0 & 0 & \sigma_{vD}^2 \end{bmatrix} \quad (56)$$

The above embodiments describe the case of correcting a state quantity through Kalman filter processing, but the present invention is not limited to the Kalman filter processing and is applicable to a correcting method intended for similar correction to the Kalman filter processing.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A position detecting apparatus used in a navigation system for detecting a vehicle position, comprising:
a sensor unit including a vehicle speed sensor for detecting a vehicle speed, an acceleration sensor for detecting vehicle acceleration, and an angular velocity sensor for detecting a vehicle angular velocity; and
a dead reckoning calculating unit for calculating state quantity inclusive of a current vehicle position, a vehicle speed, and a vehicle attitude angle based on a signal output from each of the sensors at a predetermined periodic interval,
the dead reckoning calculating unit including:
a counting unit for counting the number of vehicle speed pulses input from the vehicle speed sensor;
a moving distance calculating unit for calculating a moving distance by multiplying the number of vehicle speed pulses by an interpulse distance;
a change amount detecting unit for calculating an amount of change in vehicle attitude, including an amount of change in vehicle pitch angle and an amount of change in vehicle yaw angle;
a movement vector calculating unit for calculating a movement vector during a period from a previous state quantity calculation time up to a current state quantity calculation time;
a movement resolving unit for resolving the movement into a vehicle longitudinal component, a vehicle lateral component, and a vehicle vertical component based on the amount of change in vehicle attitude; and
a state quantity calculating unit for determining, by calculation, a vehicle position $p_n$ at the current state quantity calculation time using each of the components according to the following expression:

$$p_n(k+1) = p_n(k) + T_{nb}s_b$$

where $$p_n = \begin{bmatrix} N \\ E \\ D \end{bmatrix} = \begin{bmatrix} \text{Northward distance} \\ \text{Eastward distance} \\ \text{Downward distance} \end{bmatrix}$$

$$s_b = \begin{bmatrix} N_p L \times \cos(\dot{E}_2) \times \cos(\dot{E}_3) \\ N_p L \times \cos(\dot{E}_2) \times \sin(\dot{E}_3) \\ N_p L \times \sin(\dot{E}_2) \end{bmatrix}$$

$T_{nb}$ represents a transform matrix for transforming from a vehicle fixed coordinate system to a NED coordinate system; $s_b$ represents the moving distance vector; $N_p$ represents a number of vehicle speed pulses per sample time and L represents an interpulse distance; and the amount of change in vehicle pitch angle and the amount of change in vehicle yaw angle are represented by $\dot{E}_2$ and $\dot{E}_3$, respectively.

2. The position detecting apparatus according to claim 1, further comprising:
a state quantity correcting unit that performs state quantity correction processing at a second periodic interval longer than the predetermined periodic interval at which the dead reckoning calculating unit calculates a state quantity based on a vehicle moving speed measured using an output signal of the vehicle speed sensor and the state quantity calculated with the dead reckoning calculating unit to thereby correct the state quantity calculated with the dead reckoning calculating unit,
the state quantity correcting unit including:
a speed resolving unit for resolving the measured moving speed into a vehicle longitudinal component, a vehicle lateral component, and a vehicle vertical component based on the amount of change in vehicle attitude; and
a corrected state quantity calculating unit for determining, by calculation, a corrected state quantity based on each of the speed components, and the state quantity calculated with the dead reckoning calculating unit.

3. The position detecting apparatus according to claim 2, wherein the measured moving speed is represented by V, and the speed resolving unit resolves the moving speed into a vehicle longitudinal component, a vehicle lateral component, and a vehicle vertical component based on the following expressions:

Vehicle longitudinal component=$|V| \times \cos(\dot{E}_2) \times \cos(\dot{E}_3)$ Vehicle lateral component=$|V| \times \cos(\dot{E}_2) \times \sin(\dot{E}_3)$ Vehicle vertical component=$|V| \times \sin(\dot{E}_2)$ 4. The position detecting apparatus according to claim 1, wherein the change amount detecting unit calculates the amount of change in vehicle pitch angle and the amount of change in vehicle yaw angle based on a vehicle attitude angle calculated by the state quantity calculating unit.

5. A position detecting method used in a navigation system for calculating state quantity inclusive of a current vehicle position, a vehicle speed, and a vehicle attitude angle based on a signal output from a vehicle speed sensor for detecting a vehicle speed, an acceleration sensor for detecting vehicle acceleration, and an angular velocity sensor for detecting a vehicle angular velocity based on a dead reckoning process, comprising:
 a first step of counting the number of vehicle speed pulses input from the vehicle speed sensor;
 a second step of calculating a moving distance by multiplying the number of vehicle speed pulses by an interpulse distance;
 a third step of calculating an amount of change in vehicle attitude, including an amount of change in vehicle pitch angle and an amount of change in vehicle yaw angle;
 a fourth step of calculating a movement vector during a period from a previous state quantity calculation time up to a current state quantity calculation time using a signal output from the vehicle speed sensor;
 a fifth step of resolving the movement into a vehicle longitudinal component, a vehicle lateral component, and a vehicle vertical component based on the amount of change in vehicle attitude; and
 a sixth step of determining, by calculation using a processor, a vehicle position $p_n$ at the current state quantity calculation time using each of the components according to the following expression:

$p_n(k+1) = p_n(k) + T_{nb} s_b$ where $p_n = \begin{bmatrix} N \\ E \\ D \end{bmatrix} = \begin{bmatrix} \text{Northward distance} \\ \text{Eastward distance} \\ \text{Downward distance} \end{bmatrix}$ $s_b = \begin{bmatrix} N_p L \times \cos(\dot{E}_2) \times \cos(\dot{E}_3) \\ N_p L \times \cos(\dot{E}_2) \times \sin(\dot{E}_3) \\ N_p L \times \sin(\dot{E}_2) \end{bmatrix}$ $T_{nb}$ represents a transform matrix for transforming from a vehicle fixed coordinate system to a NED coordinate system; $s_b$ represents the moving distance vector; $N_p$ represents a number of vehicle speed pulses per sample time and L represents an interpulse distance; and the amount of change in vehicle pitch angle and the amount of change in vehicle yaw angle are represented by $\dot{E}_2$ and $\dot{E}_3$, respectively.

6. The position detecting method according to claim 5, further comprising:
 a fifth step of measuring a vehicle moving speed using an output signal of the vehicle speed sensor at a second periodic interval longer than the predetermined periodic interval at which a state quantity is calculated based on the dead reckoning process; and
 a sixth step of performing state quantity correction processing based on the measured vehicle moving speed and the state quantity calculated through the dead reckoning process to thereby correct the state quantity calculated through the dead reckoning process,
 the sixth step including:
 a resolving step of resolving the measured moving speed into a vehicle longitudinal component, a vehicle lateral component, and a vehicle vertical component based on the amount of change in vehicle attitude; and
 a calculating step of determining, by calculation, a corrected state quantity based on each of the speed components, and the state quantity calculated through the dead reckoning calculating process.

7. The position detecting method according to claim 6, wherein the measured moving speed is represented by V, and in the resolving step, the moving speed is resolved into a vehicle longitudinal component, a vehicle lateral component, and a vehicle vertical component based on the following expressions:

Vehicle longitudinal component=$|V| \times \cos(\dot{E}_2) \times \cos(\dot{E}_3)$ Vehicle lateral component=$|V| \times \cos(\dot{E}_2) \times \sin(\dot{E}_3)$ Vehicle vertical component=$|V| \times \sin(\dot{E}_2)$ 8. The position detecting method according to claim 5, wherein in the second step, the amount of change in vehicle pitch angle and the amount of change in vehicle yaw angle are calculated based on a vehicle attitude angle calculated through the dead reckoning process.

9. A position detecting apparatus used in a navigation system for detecting a vehicle position, comprising:
 a sensor unit including a vehicle speed sensor for detecting a vehicle speed, an acceleration sensor for detecting vehicle acceleration, and an angular velocity sensor for detecting a vehicle angular velocity; and
 a dead reckoning calculating unit for calculating state quantity inclusive of a current vehicle position, a vehicle speed, and a vehicle attitude angle based on a signal output from each of the sensors at a predetermined periodic interval,
 the dead reckoning calculating unit including:
 a counting unit for counting the number of vehicle speed pulses input from the vehicle speed sensor;
 a moving distance calculating unit for calculating a moving distance by multiplying the number of vehicle speed pulses by an interpulse distance;
 a change amount detecting unit for calculating an amount of change in vehicle attitude wherein the change amount detecting unit detects a change amount of vehicle yaw angle as the amount of change in vehicle attitude;
 a movement vector calculating unit for calculating a movement vector during a period from a previous state quantity calculation time up to a current state quantity calculation time;
 a movement resolving unit for resolving the movement into a vehicle longitudinal component, a vehicle lateral component, and a vehicle vertical component based on the amount of change in vehicle attitude; and
 a state quantity calculating unit for determining, by calculation, a vehicle position $p_n$ at the current state quantity calculation time using each of the components according to the following expression:

$$p_n(k+1)=p_n(k)+T_{nb}s_b$$

where $$p_n = \begin{bmatrix} N \\ E \\ D \end{bmatrix} = \begin{bmatrix} \text{Northward distance} \\ \text{Eastward distance} \\ \text{Downward distance} \end{bmatrix}$$

$$s_b = \begin{bmatrix} N_p L \times \cos(\dot{E}_3) \\ N_p L \times \sin(\dot{E}_3) \\ 0 \end{bmatrix}$$

$T_{nb}$ represents a transform matrix for transforming from a vehicle fixed coordinate system to a NED coordinate system; $s_b$ represents the moving distance vector; $N_p$ represents a number of vehicle speed pulses per sample time and L represents an interpulse distance; and the amount of change in vehicle yaw angle is represented by $\dot{E}_3$.

10. The position detecting apparatus according to claim 9, wherein the change amount detecting unit calculates the amount of change in vehicle yaw angle using an attitude angle calculated by the state quantity calculating unit.

11. The position detecting apparatus according to claim 8, The position detecting apparatus according to claim 9, further comprising:
   a state quantity correcting unit that performs state quantity correction processing at a second periodic interval longer than the predetermined periodic interval at which the dead reckoning calculating unit calculates a state quantity based on a vehicle moving speed measured using an output signal of the vehicle speed sensor and the state quantity calculated with the dead reckoning calculating unit to thereby correct the state quantity calculated with the dead reckoning calculating unit,
   the state quantity correcting unit including:
   a speed resolving unit for resolving the measured moving speed into a vehicle longitudinal component, a vehicle lateral component, and a vehicle vertical component based on the amount of change in vehicle attitude; and
   a corrected state quantity calculating unit for determining, by calculation, a corrected state quantity based on each of the speed components, and the state quantity calculated with the dead reckoning calculating unit;
   wherein the measured moving speed is represented by V, and the speed resolving unit resolves the moving speed into a vehicle longitudinal component, a vehicle lateral component, and a vehicle vertical component based on the following expressions:

Vehicle longitudinal component=$|V| \times \cos(\dot{E}_3)$

Vehicle lateral component=$|V| \times \sin(\dot{E}_3)$

Vehicle vertical component=0

12. A position detecting method used in a navigation system for calculating state quantity inclusive of a current vehicle position, a vehicle speed, and a vehicle attitude angle based on a signal output from a vehicle speed sensor for detecting a vehicle speed, an acceleration sensor for detecting vehicle acceleration, and an angular velocity sensor for detecting a vehicle angular velocity based on a dead reckoning process, comprising:

a first step of counting the number of vehicle speed pulses input from the vehicle speed sensor;

a second step of calculating a moving distance by multiplying the number of vehicle speed pulses by an interpulse distance;

a third step of calculating an amount of change in vehicle attitude wherein in-the second step, a change amount of vehicle yaw angle is detected as the amount of change in vehicle attitude;

a fourth step of calculating a movement vector during a period from a previous state quantity calculation time up to a current state quantity calculation time using a signal output from the vehicle speed sensor;

a fifth step of resolving the movement into a vehicle longitudinal component, a vehicle lateral component, and a vehicle vertical component based on the amount of change in vehicle attitude; and a sixth step of determining, by calculation using a processor, a vehicle position $p_n$ at the current state quantity calculation time using each of the components according to the following expression:

$$p_n(k+1)=p_n(k)+T_{nb}s_b$$

where $$p_n = \begin{bmatrix} N \\ E \\ D \end{bmatrix} = \begin{bmatrix} \text{Northward distance} \\ \text{Eastward distance} \\ \text{Downward distance} \end{bmatrix}$$

$$s_b = \begin{bmatrix} N_p L \times \cos(\dot{E}_3) \\ N_p L \times \sin(\dot{E}_3) \\ 0 \end{bmatrix}$$

$T_{nb}$ represents a transform matrix for transforming from a vehicle fixed coordinate system to a NED coordinate system; $s_b$ represents the moving distance vector; $N_p$ represents a number of vehicle speed pulses per sample time and L represents an interpulse distance; and the amount of change in vehicle yaw angle is represented by $\dot{E}_3$.

13. The position detecting method according to claim 12, wherein in the second step, the amount of change in vehicle yaw angle is calculated using an attitude angle calculated through the dead reckoning process.

14. The position detecting method according to claim 12, further comprising:
   a fifth step of measuring a vehicle moving speed using an output signal of the vehicle speed sensor at a second periodic interval longer than the predetermined periodic interval at which a state quantity is calculated based on the dead reckoning process; and
   a sixth step of performing state quantity correction processing based on the measured vehicle moving speed and the state quantity calculated through the dead reckoning process to thereby correct the state quantity calculated through the dead reckoning process,
   the sixth step including:
   a resolving step of resolving the measured moving speed into a vehicle longitudinal component, a vehicle lateral component, and a vehicle vertical component based on the amount of change in vehicle attitude; and a calculating step of determining, by calculation, a corrected state quantity based on each of the speed components, and the state quantity calculated through the dead reckoning calculating process;

wherein the measured moving speed is represented by V, and in the resolving step, the moving speed is resolved into a vehicle longitudinal component, a vehicle lateral component, and a vehicle vertical component based on the following expressions:

Vehicle longitudinal component=$|V| \times \cos(\dot{E}_3)$

Vehicle lateral component=$|V| \times \sin(\dot{E}_3)$

Vehicle vertical component=0

\* \* \* \* \*

UNITED STATES PATENT AND TRADEMARK OFFICE
CERTIFICATE OF CORRECTION

PATENT NO. : 8,195,392 B2
APPLICATION NO. : 12/428182
DATED : June 5, 2012
INVENTOR(S) : Takayuki Watanabe et al.

It is certified that error appears in the above-identified patent and that said Letters Patent is hereby corrected as shown below:

In the Claims

In column 29, claim 11, line 28, delete "The position detecting apparatus according to claim 8,".

Signed and Sealed this
Seventh Day of August, 2012

David J. Kappos
*Director of the United States Patent and Trademark Office*